United States Patent
Kim et al.

(10) Patent No.: US 10,197,453 B2
(45) Date of Patent: Feb. 5, 2019

(54) SEMICONDUCTOR DEVICE

(71) Applicants: SK hynix Inc., Icheon (KR); Seoul National University R&DB Foundation, Seoul (KR)

(72) Inventors: Jae-Hoon Kim, Seoul (KR); Dae-Yong Shim, Seoul (KR); Suhwan Kim, Seoul (KR)

(73) Assignees: SK HYNIX INC., Icheon (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/466,785

(22) Filed: Mar. 22, 2017

(65) Prior Publication Data
US 2017/0191878 A1 Jul. 6, 2017

Related U.S. Application Data

(62) Division of application No. 14/056,774, filed on Oct. 17, 2013, now Pat. No. 9,645,015.

(30) Foreign Application Priority Data

Nov. 23, 2012 (KR) .................. 10-2012-0134048

(51) Int. Cl.
*B41J 35/18* (2006.01)
*G01K 7/01* (2006.01)

(52) U.S. Cl.
CPC ...................... *G01K 7/01* (2013.01)

(58) Field of Classification Search
None
See application file for complete search history.

(56) References Cited

U.S. PATENT DOCUMENTS

| 5,731,742 A * | 3/1998 | Wojewoda | H03L 1/023 331/158 |
| 7,033,072 B2 | 4/2006 | Aota et al. | |
| 2005/0174164 A1 | 8/2005 | Fuhrmann et al. | |
| 2005/0270011 A1 | 12/2005 | Aota et al. | |
| 2006/0220940 A1 * | 10/2006 | Oh | H03K 19/0948 341/155 |
| 2011/0204873 A1 * | 8/2011 | Jeong | G01K 7/21 324/71.1 |
| 2012/0004880 A1 | 1/2012 | Hsu et al. | |

FOREIGN PATENT DOCUMENTS

| CN | 101430231 A | 5/2009 |
| CN | 102207409 A | 5/2011 |
| EP | 2 056 083 A2 | 5/2009 |
| KR | 10-2011-0097470 A | 8/2011 |
| KR | 10-2012-0021033 A | 3/2012 |

OTHER PUBLICATIONS

Office Action from Taiwanese Patent Office for Application No. 102139977, dated Jun. 13, 2017.

* cited by examiner

*Primary Examiner* — Erica Lin

(57) ABSTRACT

A semiconductor device includes a first signal generator configured to generate a plurality of first signals and a second signal generator configured to generate a plurality of second signals. One of the plurality of first signals varies in one of a plurality of temperature sections. One of the plurality of second signals is substantially constant in one of the plurality of temperature sections.

11 Claims, 23 Drawing Sheets

<PRIOR ART>

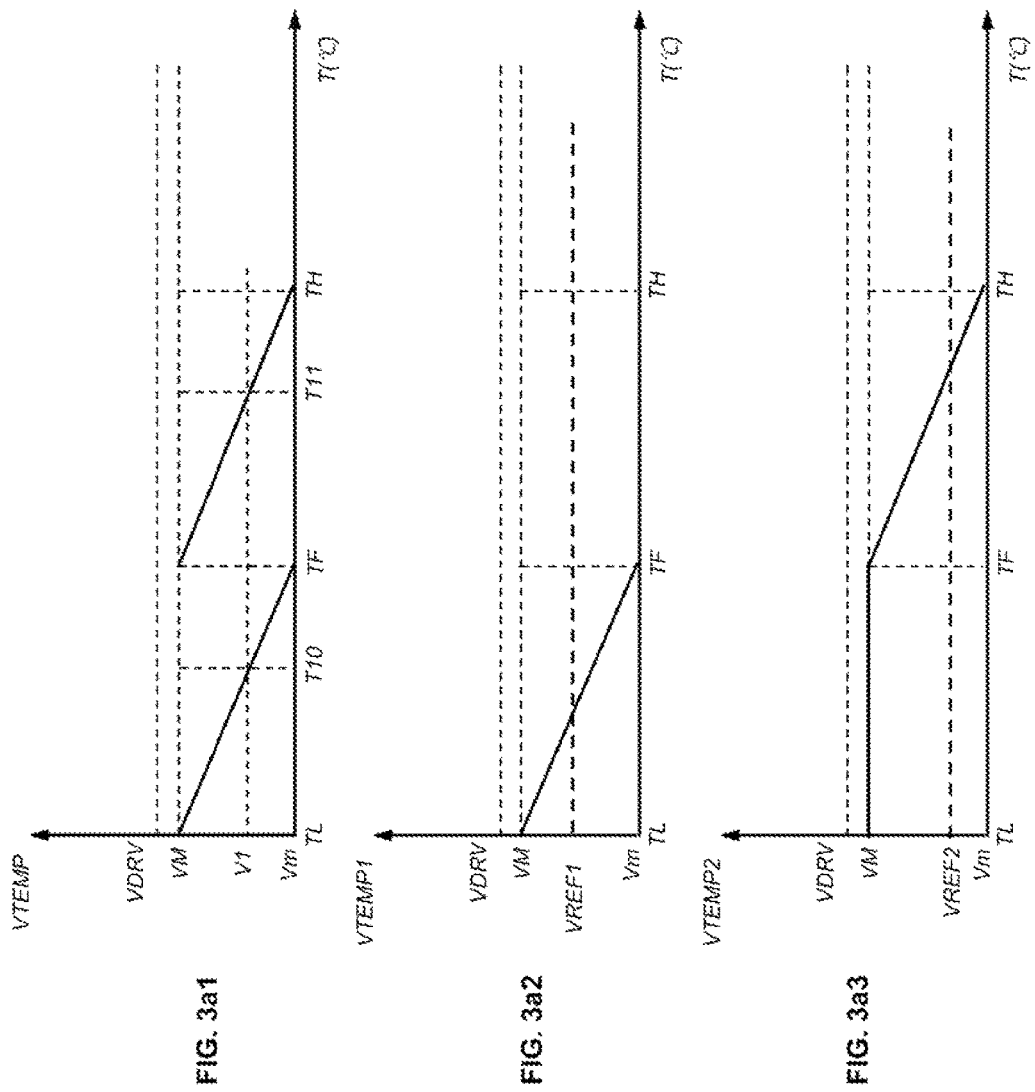

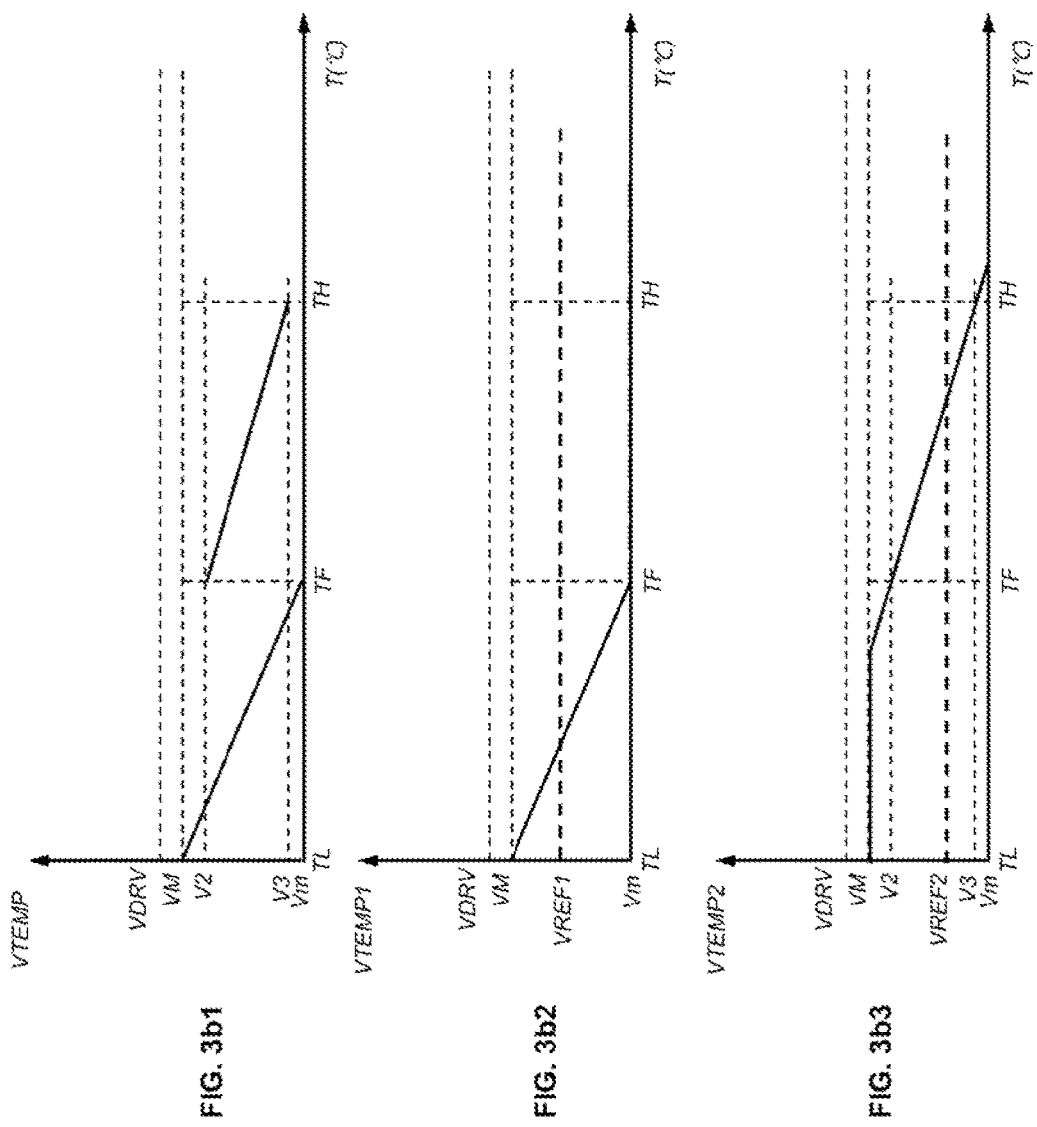

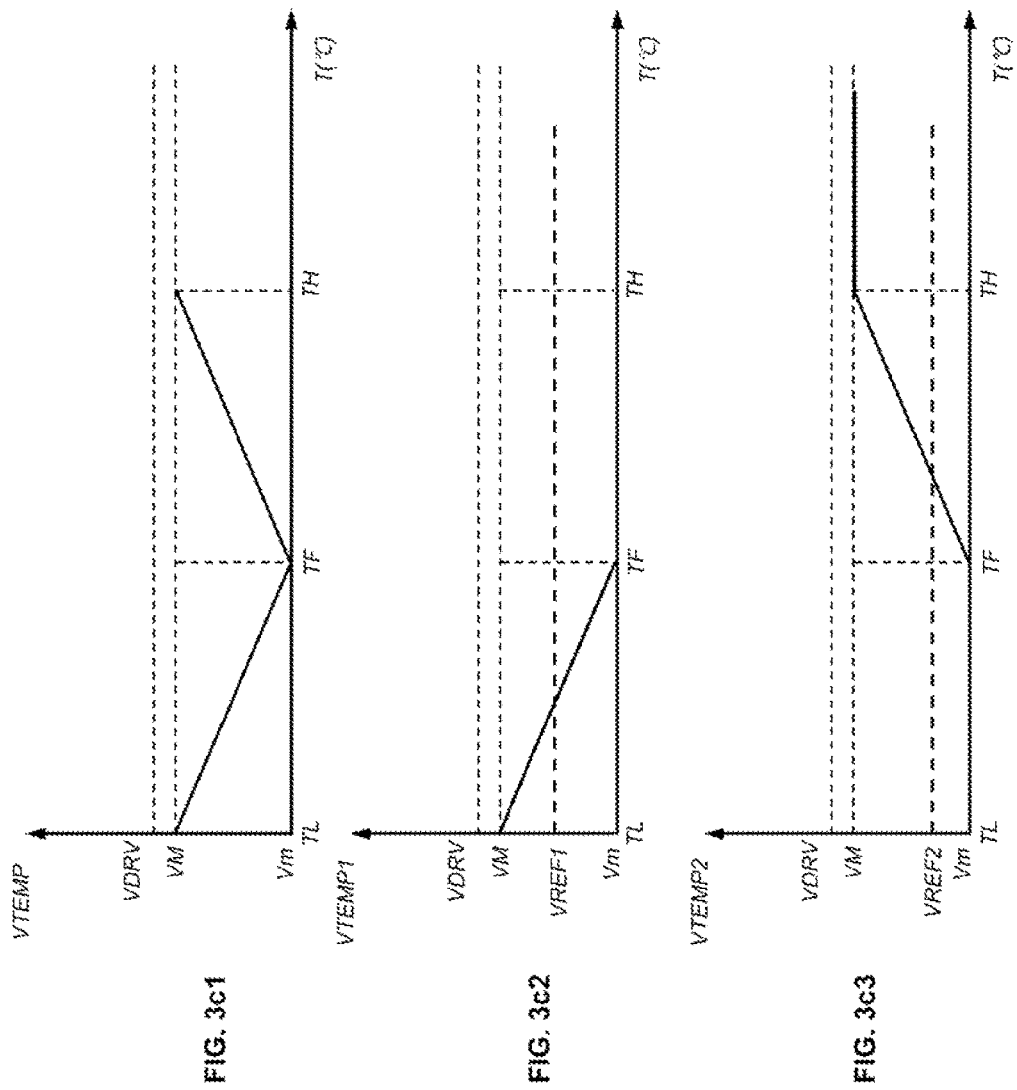

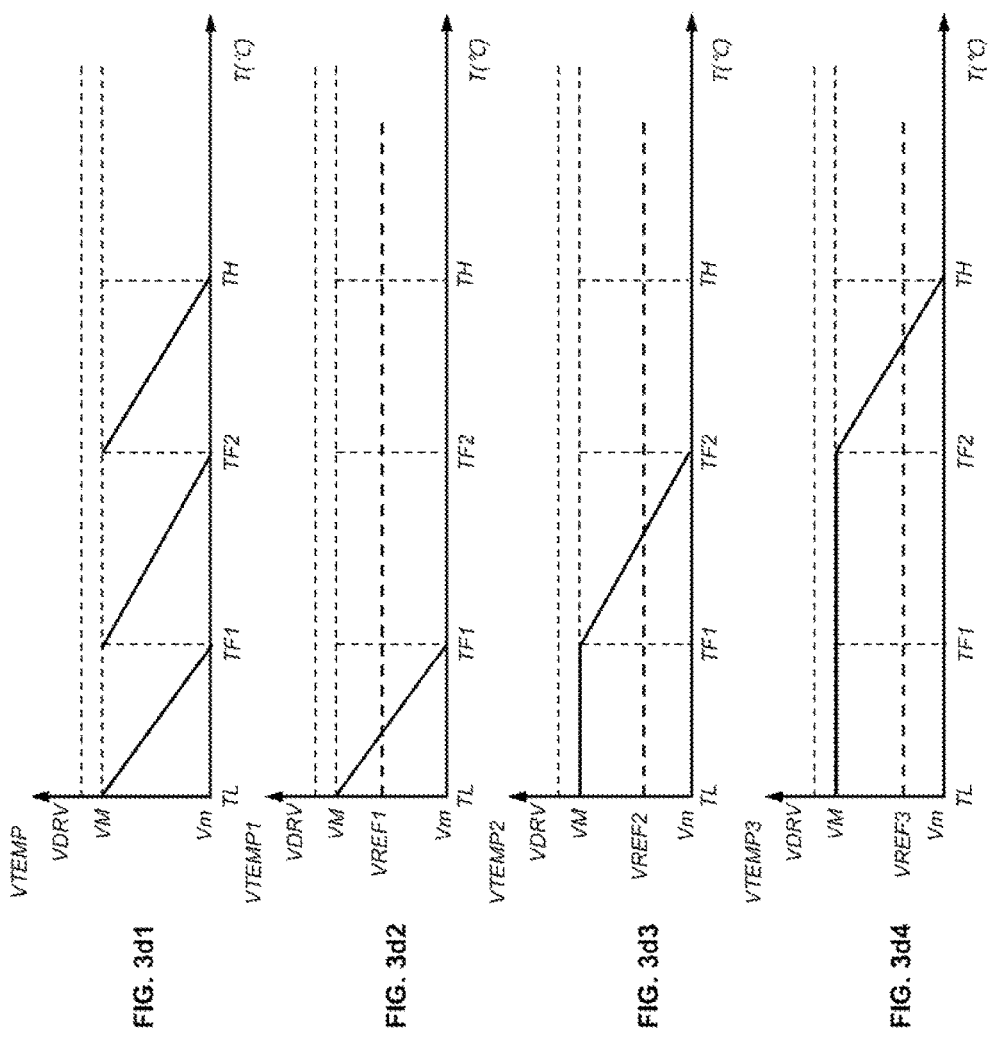
FIG. 3d1  FIG. 3d2  FIG. 3d3  FIG. 3d4

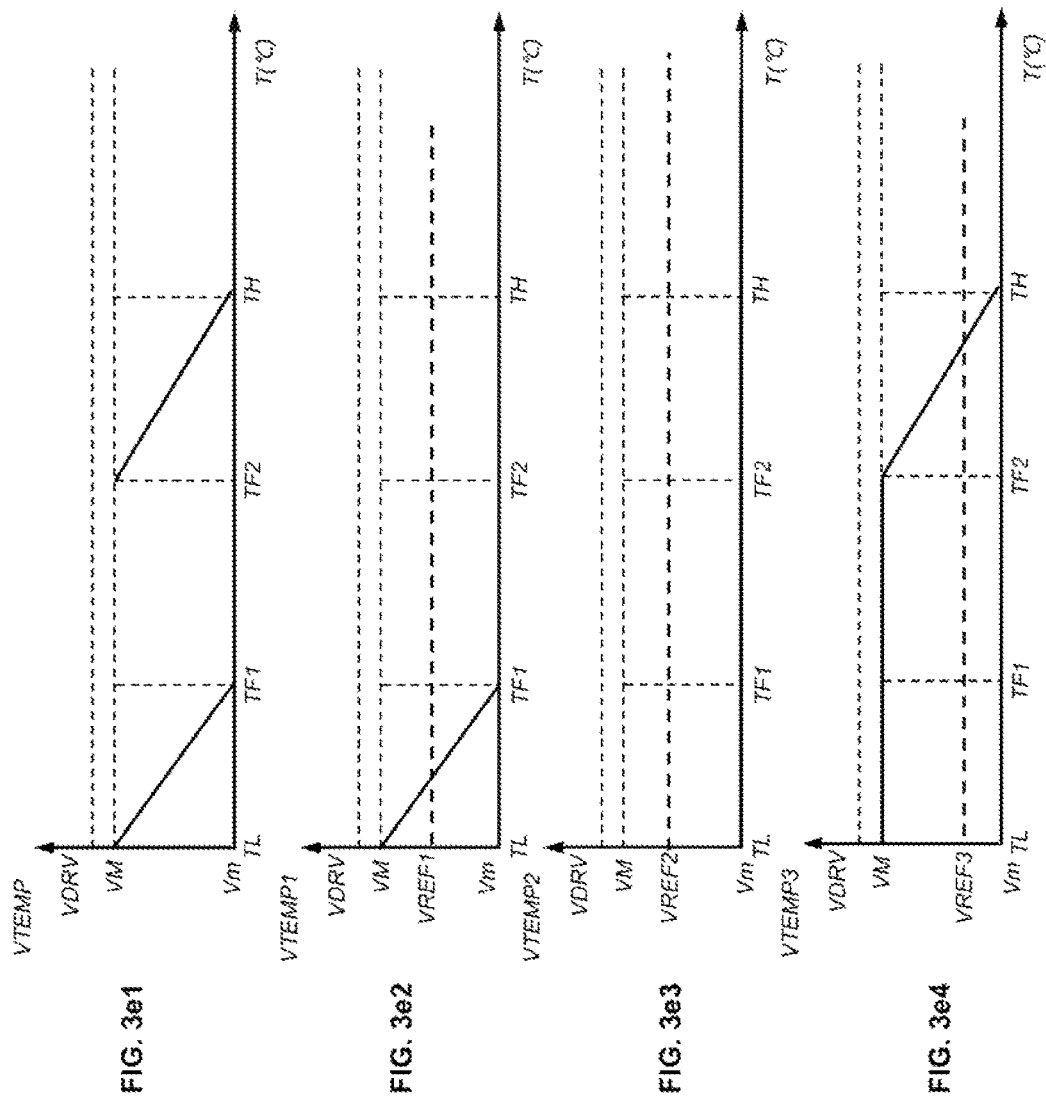

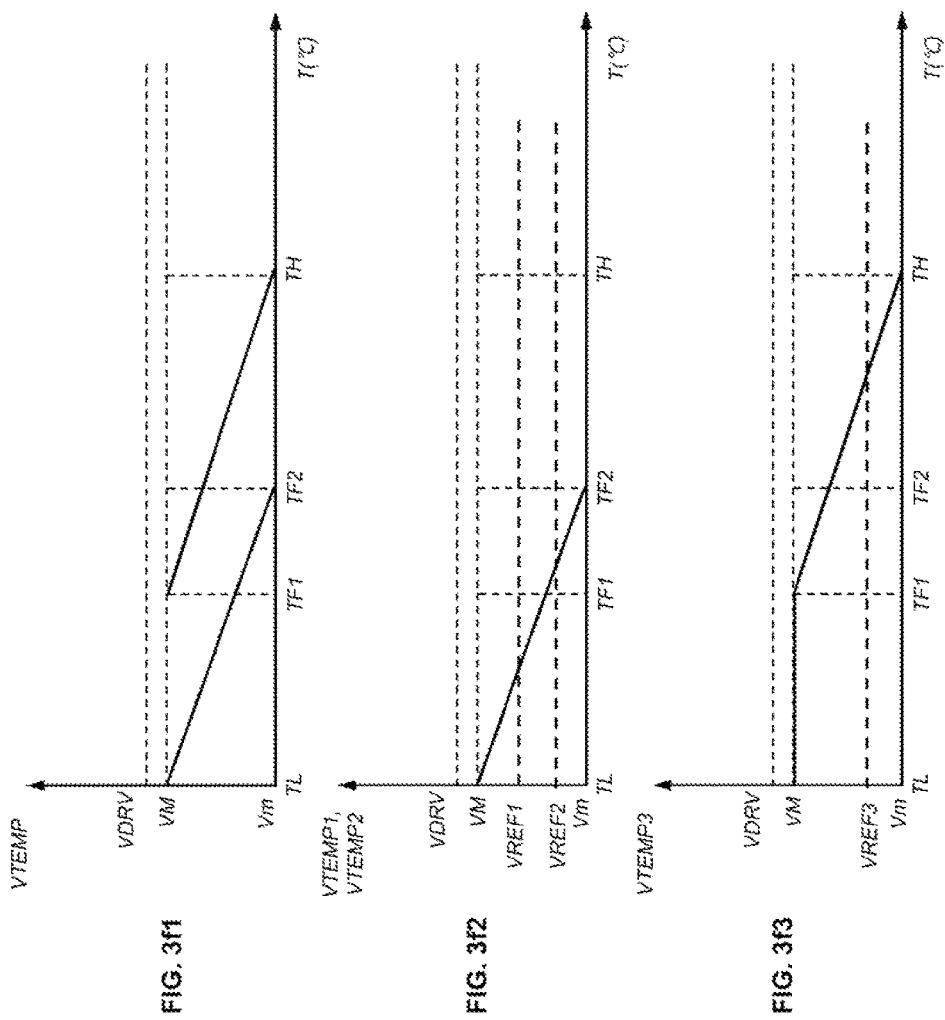
FIG. 3f1    FIG. 3f2    FIG. 3f3

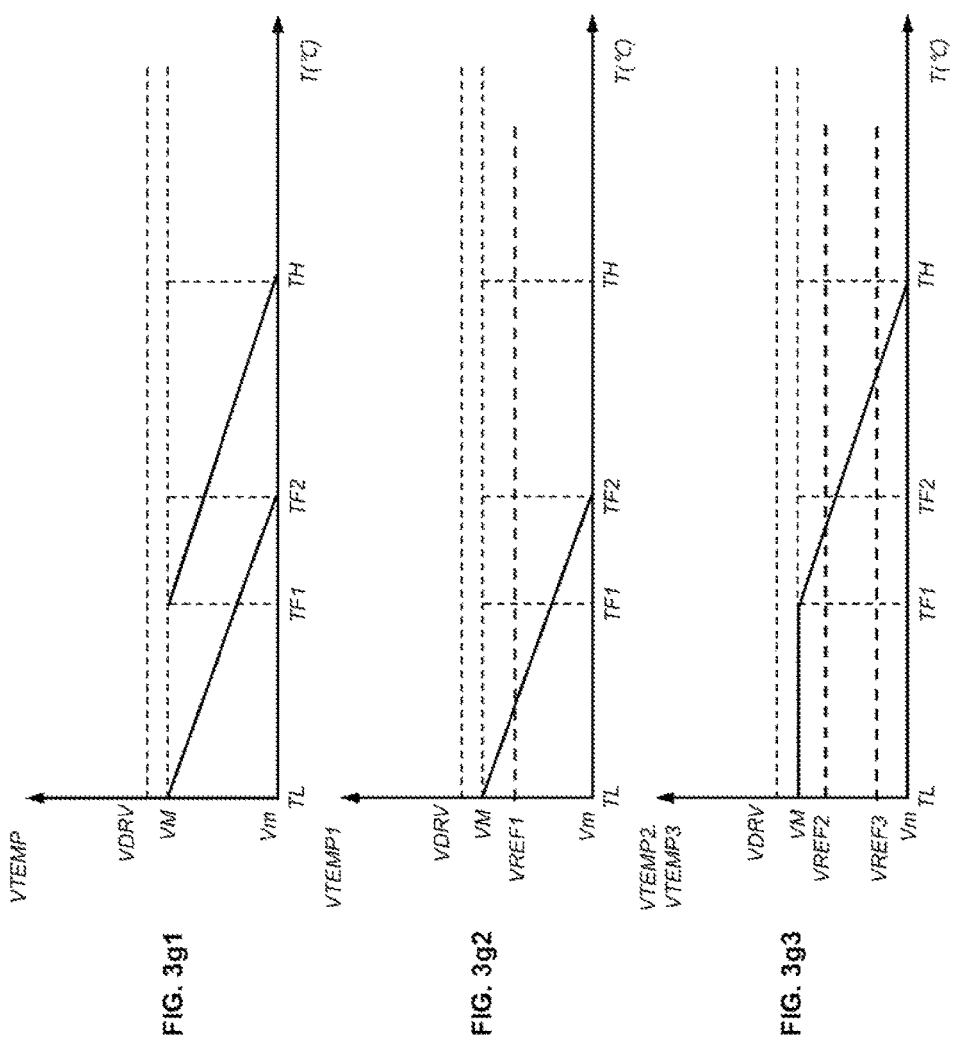

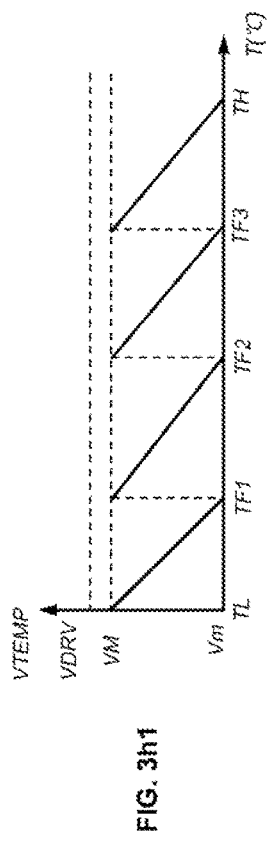
FIG. 3h1
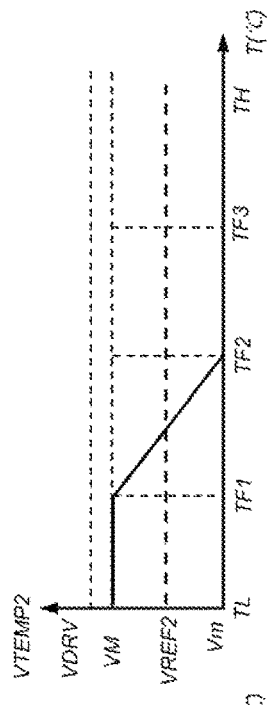
FIG. 3h3
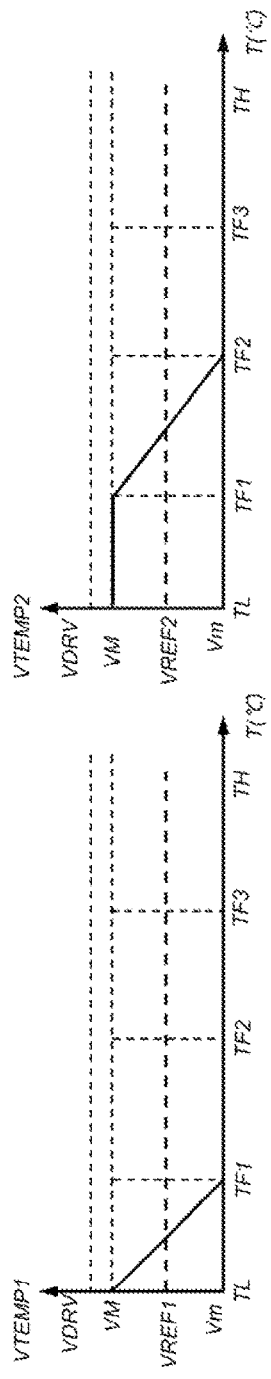
FIG. 3h2
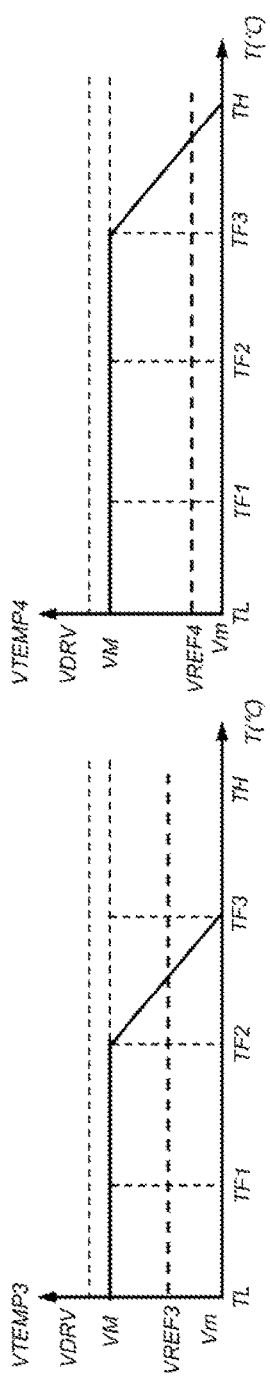
FIG. 3h5
FIG. 3h4

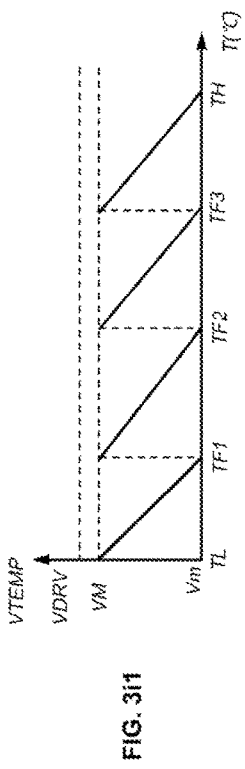
FIG. 3i1
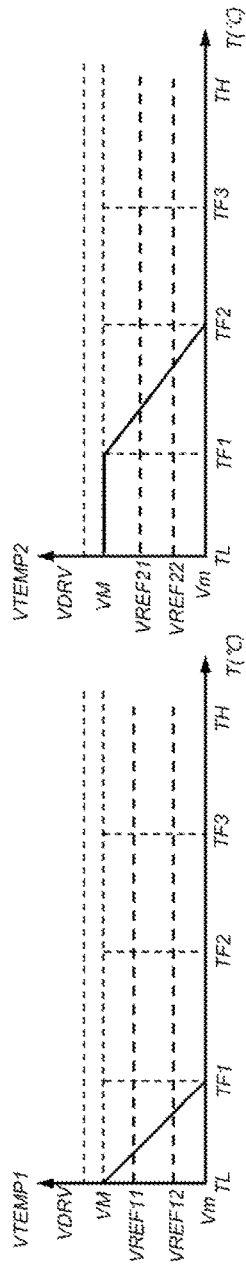
FIG. 3i2
FIG. 3i3
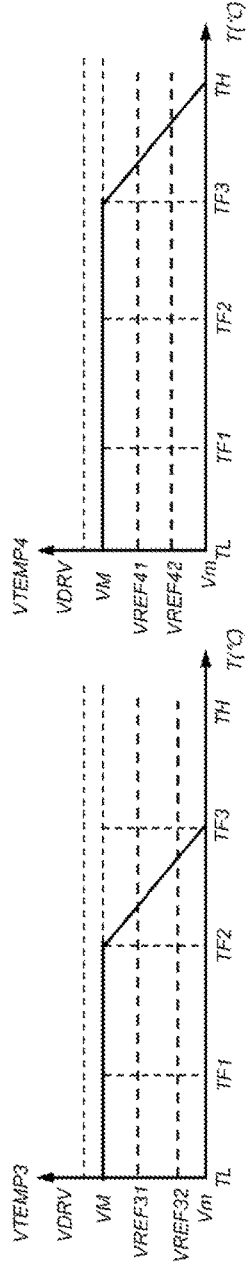
FIG. 3i4
FIG. 3i5

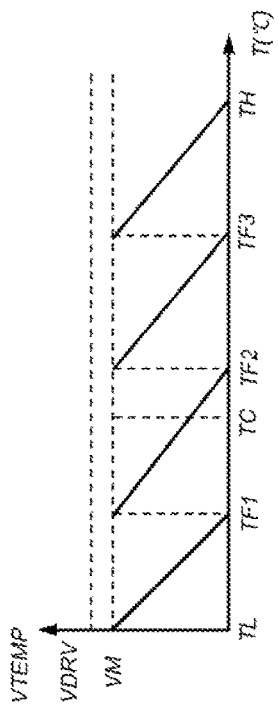
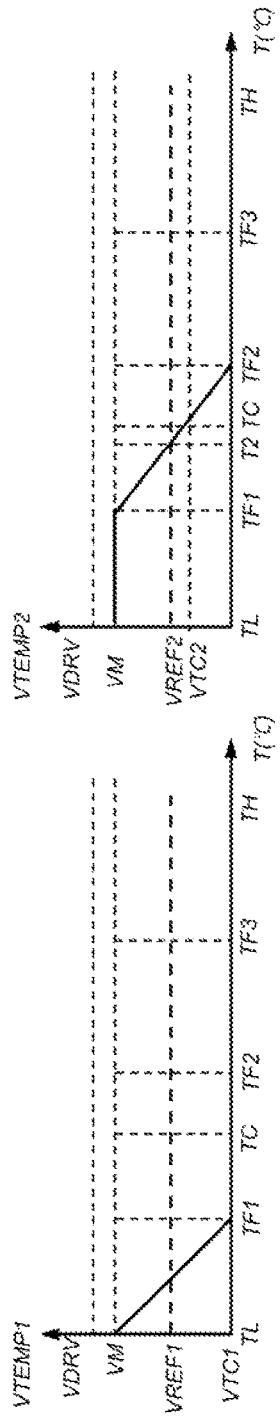
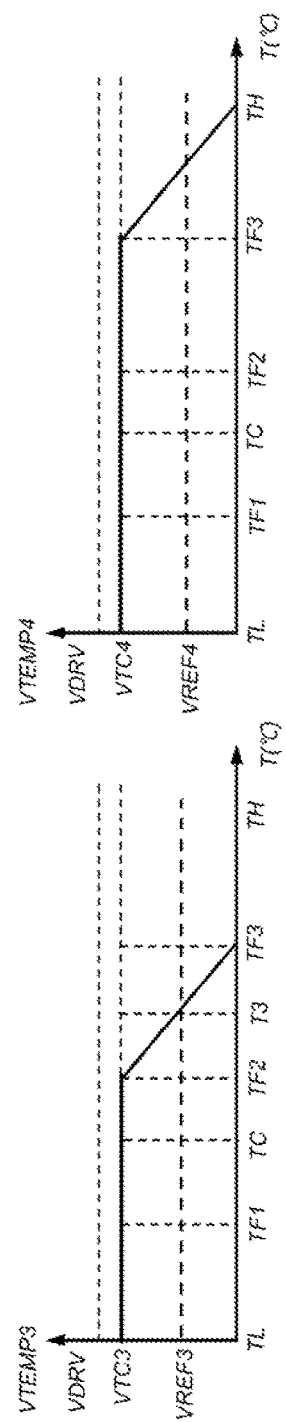
FIG. 13a
FIG. 13b  LATCH(3-2) = 1
FIG. 13c  LATCH(3-3) = 1
FIG. 13d  LATCH(3) = 0
FIG. 13e  LATCH(3) = 0
T2 < TC < T3

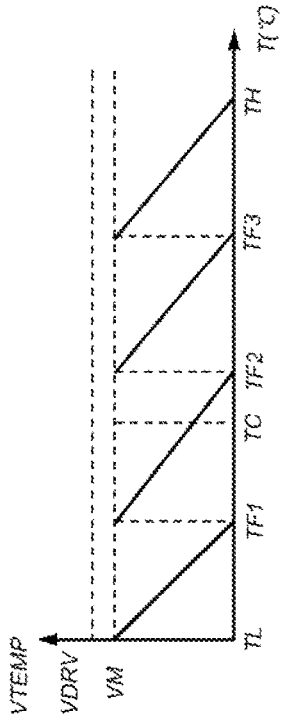
FIG. 15a
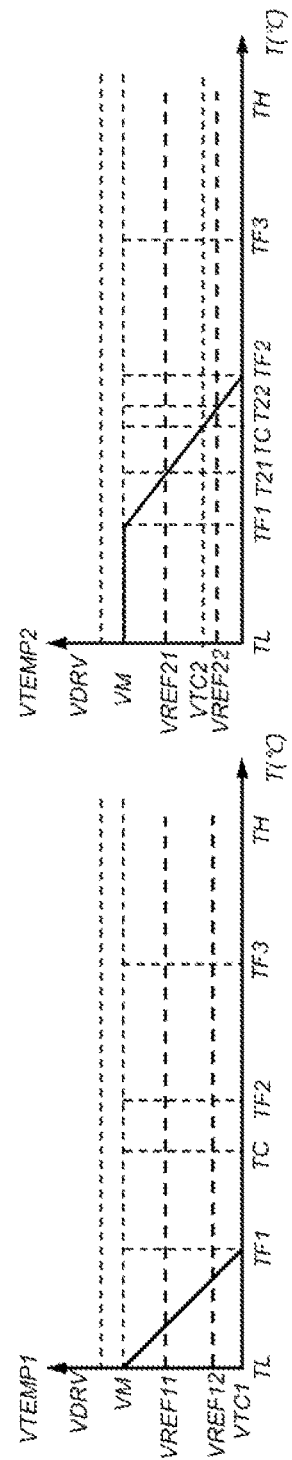
FIG. 15b
FIG. 15c
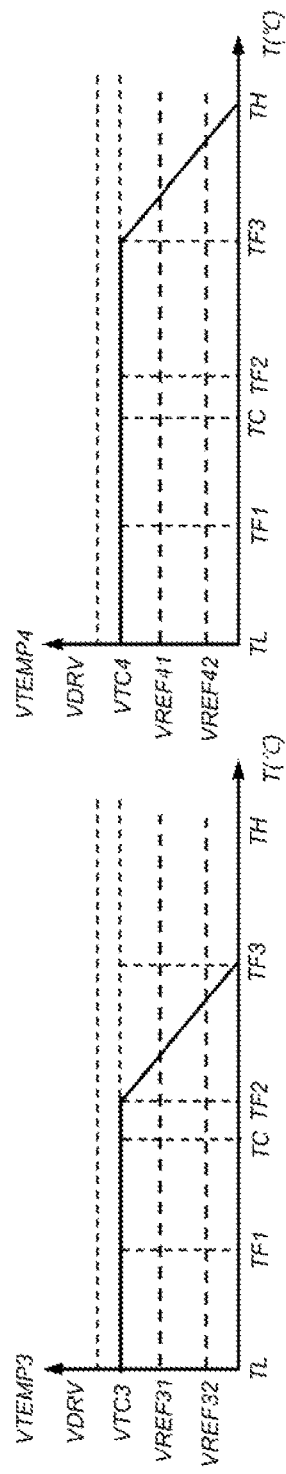
FIG. 15d
FIG. 15e
$T21 < TC < T22$

SEMICONDUCTOR DEVICE

CROSS-REFERENCE TO RELATED APPLICATION

The present application is a divisional of U.S. patent application Ser. No. 14/056,744, filed on Oct. 17, 2013, which claims priority of Korean Patent Application No. 10-2012-0134048, filed on Nov. 23, 2012, which is incorporated herein by reference in its entirety.

BACKGROUND

1. Technical Field

Embodiments of the present disclosure relate to a semiconductor device, and more particularly, to a semiconductor device capable of measuring temperature at a low driving voltage.

2. Related Art

A system including semiconductor devices therein may measure a temperature and control various operation parameters of the semiconductor devices according to the measured temperature.

FIG. 1 is a block diagram illustrating a temperature voltage generator according to a prior art.

The temperature voltage generator includes a voltage controller 10 configured to receive a reference voltage VIN and generate a control voltage VC; and a voltage output device 20 configured to output a temperature voltage VTEMP according to the control voltage VC. The voltage controller 10 includes a resistor R1 and an NMOS transistor N1, both of which are connected in series. The voltage output device 20 includes resistors R2, R3 and an NMOS transistor N2, all of which are connected in series.

FIG. 2 is a graph illustrating issues related to a temperature voltage generator according to the prior art of FIG. 1 at a low driving voltage VDRV.

The slope and the level of the temperature voltage VTEMP in FIG. 2 may be adjusted by varying resistance values of the resistors R1~R3 and the reference voltage VIN. As the the driving voltage VDRV falls as illustrated in FIG. 2, the slope of the temperature voltage VTEMP of the conventional temperature voltage generator decreases. Since the slope of the temperature voltage VTEMP generated by the temperature voltage generator having the lower driving voltage $VDRV_L$ decreases, the same change in the temperature voltage VTEMP results in a larger change in measured temperature T than that generated by the temperature voltage generator having a higher driving voltage $VDRV_H$. As a result, measurement of a temperature by the temperature voltage generator operating under the lower driving voltage $VDRV_L$ makes precise measuring difficult.

SUMMARY

Various embodiments are directed to a semiconductor device capable of measuring temperature at a low driving voltage.

In an embodiment, a semiconductor device may include a control voltage generator for generating a control voltage according to a temperature section signal; and a temperature voltage output block for outputting a temperature voltage varying with temperature according to the control voltage and the temperature section signal.

In an embodiment, a semiconductor device may include a first signal generator for generating a first signal varying with temperature in a temperature section; and a second signal generator for generating a second signal that is constant in the temperature section.

In an embodiment, a semiconductor may include a controller for sequentially generating a plurality of temperature signals, each corresponding to a temperature section; a reference voltage generator for sequentially generating first reference voltages according to the plurality of temperature signals; a temperature voltage generator for sequentially generating temperature voltages according to the plurality of temperature signals and a plurality of second reference voltages; and a comparator for sequentially comparing the first reference voltages and the temperature voltages.

In an embodiment, the reference voltage generator may include a voltage divider for dividing a driving voltage to generate a plurality of divided voltages; and a first selector for sequentially selecting one of the plurality of divided voltages as the first reference voltages according to the plurality of temperature signals.

In an embodiment, the reference voltage generator may further include a second selector for sequentially selecting one of the plurality of divided voltages as the second voltages according to the plurality of temperature signals.

In an embodiment, the semiconductor device may further comprise a voltage divider for dividing a driving voltage to generate a plurality of divided voltages; and a selector for sequentially selecting one of the plurality of divided voltages as the second reference voltages according to the plurality of temperature signals.

In an embodiment, the temperature voltage generator may include a control voltage generator for sequentially generating a plurality of control voltages according to the plurality of temperature signals; and a temperature voltage output block for sequentially outputting the plurality of temperature voltages according to the plurality of temperatures signals and the plurality of control voltages.

In an embodiment, the control voltage generator may include a first resistor block whose resistance is sequentially controlled by the plurality of temperature signals; and a second resistor block whose resistance is sequentially controlled by the plurality of second reference voltages, and wherein the plurality of control voltages are determined by resistance ratio of the first resistor block and the second resistor block.

In an embodiment, the temperature voltage output block may include a third resistor block whose resistance is sequentially controlled by the plurality of temperature signals; and a fourth resistor block whose resistance is sequentially controlled by the plurality of control voltages, wherein the plurality of temperature voltages are determined by resistance ratio of the third resistor block and the fourth resistor block.

In an embodiment, the semiconductor device may further include a plurality of latches for sequentially storing an output from the comparator according to the plurality of temperature signals; and a decoder for generating a temperature code according to the values of the plurality of latches.

In an embodiment, a semiconductor device may generate a plurality of temperature voltages, each varying with temperature in a corresponding temperature section among a plurality of temperature sections, wherein a temperature voltage corresponds to two or more temperatures that are included in different temperature sections.

BRIEF DESCRIPTION OF THE DRAWINGS

FIG. 3a1 to FIG. 3i5 are graphs illustrating various kinds of temperature voltages output from a temperature voltage generator in accordance with an embodiment.

FIG. 5 is a circuit diagram illustrating a temperature voltage generator in accordance with an embodiment.

FIG. 13a to FIG. 13e include graphs illustrating temperature voltages of the semiconductor device operating in accordance with the flow chart of FIG. 12.

FIG. 15a to FIG. 15e include graphs illustrating temperature voltages of the semiconductor device operating in accordance with the flow chart of FIG. 14.

DETAILED DESCRIPTION

Figure 1:
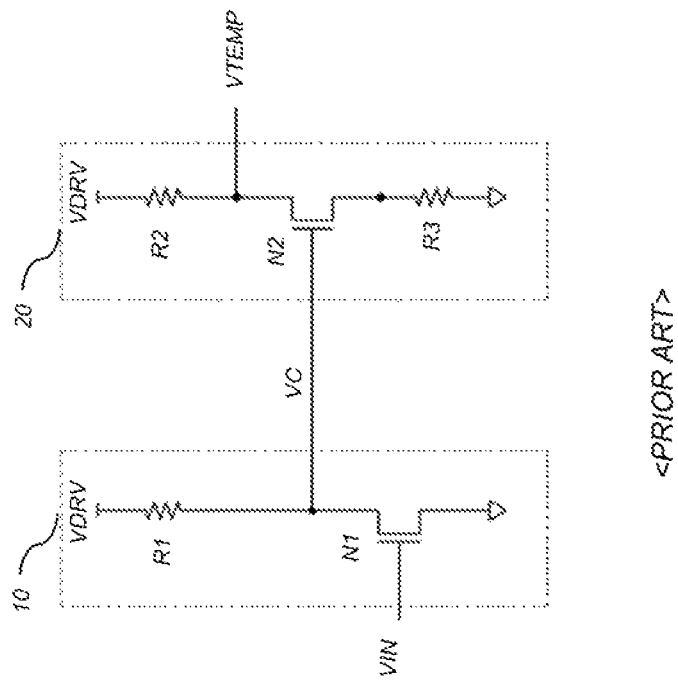
FIG. 1 is a block diagram illustrating a conventional temperature voltage generator.

Various embodiments will be described below in more detail with reference to the accompanying drawings. These embodiments of the present disclosure may, however, take/be instantiated in different forms and should not be construed as limited to the embodiments set forth herein. Throughout the disclosure, like reference numerals refer to like parts throughout the various figures and embodiments of the present disclosure.

FIGS. 3a1 to FIG. 3i5 are graphs illustrating various kinds of temperature voltages output from a temperature voltage generator in accordance with an embodiment.

In these embodiments, a temperature section corresponding to a temperature measurement range is divided into a plurality of temperature sections. The number of divided temperature sections and intervals of each divided temperature section, may vary according to embodiments.

Temperature voltages in one of the divided temperature section may vary with temperature, differently from temperature voltages in other divided temperature sections. In some embodiments, the same temperature voltage corresponds to two or more temperatures, which may be included in different temperature sections.

FIGS. 3a1-3 to FIGS. 3c1-3 may represent embodiments where a temperature section TL~TH is divided into two temperature sections TL~TF and TF~TH. Considering a voltage drop in a circuit, the maximum temperature voltage VM may be smaller than a driving voltage VDRV.

In an embodiment shown in FIGS. 3a1-3, a temperature voltage V1 corresponds to two temperatures T10 and T11, each of which is included in different temperature sections.

In an embodiment, a temperature voltage in a temperature section may vary with temperatures in the temperature section differently from those in other temperature sections.

Referring back to FIG. 2, the ratio S0 between a difference between the maximum and minimum temperature voltages VM and Vm and the interval of the temperature section TL~TH is represented as the following Equation 1:

$$S0=(VM-Vm)/(TH-TL) \qquad \text{[Equation 1]}.$$

Figure 2:
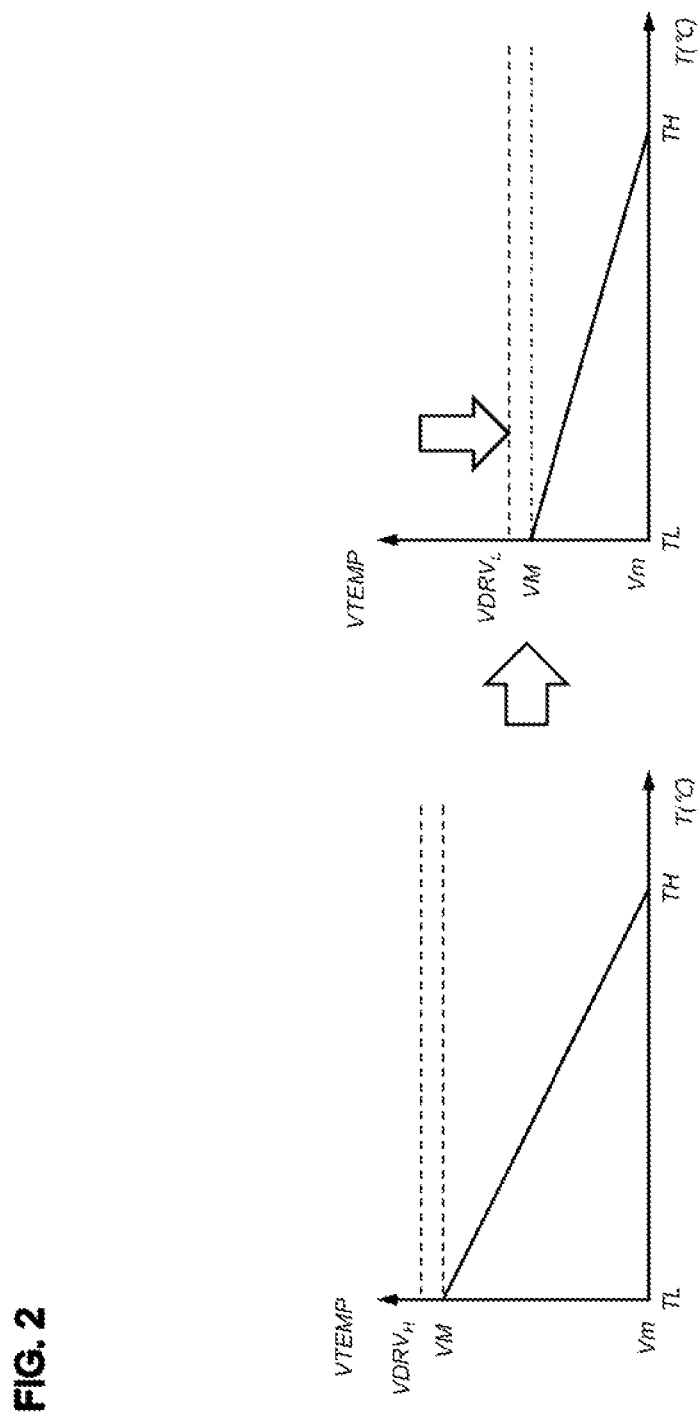
FIG. 2 is a graph illustrating issues related to a conventional temperature voltage generator at a low driving voltage.

Equation 1 corresponds to a slope of the temperature voltage VTEMP output from a conventional temperature voltage generator according to FIG. 2.

Referring to FIGS. 3a1 to 3a3, slopes S1 and S2 of temperature voltage output VTEMP from a temperature voltage generator in accordance with an embodiment of the present disclosure in each temperature section TL~TF and TF~TH are represented by the following Equations 2 and 3, respectively:

$$S1=(VM-Vm)/(TF-TL) \qquad \text{[Equation 2]};$$

$$S2=(VM-Vm)/(TH-TF) \qquad \text{[Equation 3]}.$$

Both values of the slopes S1 and S2 are greater than the value of the slope S0.

In the conventional approach, the maximum temperature voltage VM decreases as the driving voltage VDRV becomes lower. This results in a decrease in the slope of the temperature voltage VTEMP, and thus even a small change in the temperature voltage VTEMP may cause a large change in corresponding temperature. As a result, precise measurement of a temperature by the temperature voltage generator operating under the lower driving voltage VDRV becomes more difficult.

In an embodiment, one temperature section corresponding to a temperature measurement range is divided into a plurality of temperature sections. Therefore, as the driving voltage VDRV becomes lower, the slope of the temperature voltage VTEMP in each temperature section may have a value greater than a predetermined value.

The predetermined value may vary according to embodiments. In an embodiment, the predetermined value for a temperature section is greater than S0 of Equation 1. The predetermined value for another temperature section where temperature measurement need not as precise as the previous temperature section may be equal to or less than S0 of Equation 1.

The temperature voltage VTEMP in FIG. 3a1 may be considered as a combination of two temperature voltages VTEMP1 and VTEMP2 shown in FIGS. 3a2 and 3a3, respectively. Each of the temperature voltages VTEMP1 and VTEMP2 may be generated in sequence by a temperature voltage generator shown in FIG. 5.

Referring to FIG. 3a2, the first temperature voltage VTEMP1 has a desired slope in the first temperature section TL~TF. The first temperature voltage VTEMP1 has the minimum temperature voltage Vm in the second temperature section TF~TH. Referring to FIG. 3a3, the second temperature voltage VTEMP2 has a desired slope in the second temperature section TF~TH. The second temperature voltage VTEMP2 has the maximum temperature voltage VM in the first temperature section TL~TF.

In an embodiment, a reference voltage whose value remains substantially the same in a corresponding temperature section is compared with a temperature voltage varying in the corresponding temperature section. As illustrated in FIGS. 3a2 and 3a3, the first reference voltage VREF1 and the second reference voltage VREF2 are compared with the first temperature voltage VTEMP1 and the second temperate voltage VTEMP2, respectively. In another embodiment, two or more reference voltages are used in each temperature section to increase a resolution of temperature measurement, which will be described in detail with reference to FIGS. 14 and 15a to 15e.

Referring to FIGS. 3b1 to 3b3, the maximum temperature voltage VM and/or the minimum temperature voltage Vm in one temperature section are different from those V2 and V3 in the other temperature section.

As a result, when a temperature voltage VTEMP is higher than the maximum temperature voltage V2 or lower than the minimum temperature voltage V3 in the second temperature section TF~TH, the temperature voltage VTEMP may correspond to one temperature.

When a temperature voltage VTEMP is between the maximum and minimum voltages V2 and V3, the temperature voltage VTEP corresponds to two temperatures, which are included in different temperature sections.

The temperature voltage VTEMP in FIG. 3b1 may be considered as a combination of two temperature voltages VTEMP1 and VTEMP2 shown in FIGS. 3b2 and 3b3, respectively. Each of the temperature voltages VTEMP1 and VTEMP2 may be generated in sequence by a temperature voltage generator shown in FIG. 5.

Referring to FIG. 3c1, while temperature voltage VTEMP in the first temperature section TL~TF has a positive slope, the temperature voltage VTEMP in the second temperature section TF~TH has a negative slope. The temperature voltage VTEMP in FIG. 3c1 may be considered as a combination of two temperature voltages VTEMP1 and VTEMP2 shown in FIGS. 3c2 and 3c3, respectively. Each of the temperature voltages VTEMP1 and VTEMP2 may be generated in sequence by a temperature voltage generator shown in FIG. 5.

FIGS. 3d1 to 3g3 illustrate temperature voltages output from a temperature voltage generator in accordance with embodiments that divide a temperature range TL~TH into three temperature sections TL~TF1, TF1~TF2 and TF2~TH.

The temperature voltage VTEMP in FIG. 3d1 may be considered as a combination of three temperature voltages VTEMP1, VTEMP2, and VTEMP3 shown in FIGS. 3d2, 3d3, and 3d4, respectively. Each of the temperature voltages VTEMP1, VTEMP2, and VTEMP3 may be generated in sequence by a temperature voltage generator shown in FIG. 5.

Figure 4:
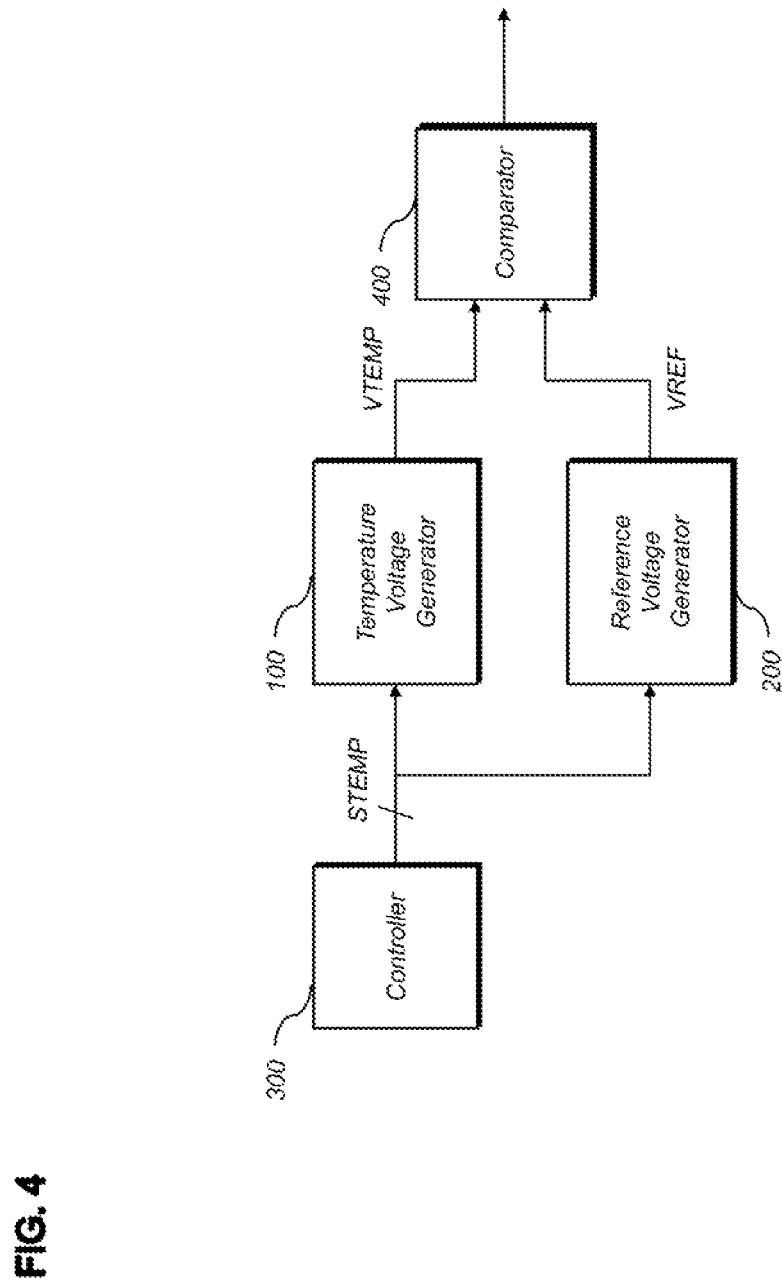
FIG. 4 is a block diagram illustrating a semiconductor device in accordance with an embodiment.

In an embodiment, a reference voltage whose value remains substantially the same in a corresponding temperature section is compared with a temperature voltage varying in the corresponding temperature section. For example, as illustrated in FIGS. 3d2 to 3d4, the first reference voltage VREF1, the second reference voltage VREF2, and the third reference voltage VREF3 are compared with the first temperature voltage VTEMP1, the second temperature voltage VTEMP2, and third temperature voltage VTEMP3, respectively.

Referring to FIG. 3e1, temperature voltage VTEMP in the second temperature section TF1~TF2 where precise temperature measurement is not as desirable as the other temperature sections (e.g., TL~TF1 and TF2~TH) is maintained substantially at the minimum voltage temperature Vm.

The temperature voltage VTEMP in FIG. 3e1 may be considered as a combination of three temperature voltages VTEMP1, VTEMP2, and VTEMP3 shown in FIGS. 3e2, 3e3, and 3e4, respectively. Each of the temperature voltages VTEMP1, VTEMP2, and VTEMP3 may be generated in sequence by a temperature voltage generator shown in FIG. 5.

Referring to FIGS. 3f1 and 3g1, the second temperature section TF1~TF2 is a boundary section between the first and third temperature sections TL~TF1 and TF2~TH. The first, second, and third temperature voltages VTEMP1, VTEMP2, and VTEMP3 correspond to temperature voltages in the first, second, and third temperature sections TL~TF1, TF1~TF2, and TF2~TH, respectively. In an embodiment, as shown in FIG. 3f2, the second temperature voltage VTEMP2 and the first temperature voltage VTEMP1 are continuous at the temperature TF1. In another embodiment, as shown in FIG. 3g3, the second temperature voltage VTEMP2 and the third temperature voltage VTEMP3 are continuous at the temperature TF2.

In an embodiment where a temperature is determined by scanning from low temperature TL to high temperature TH, a temperature corresponding to the temperature voltage VTEMP is determined using the left graph of FIG. 3f1 in the first and second temperature sections TL~TF1 and TF1~TF2, and the right graph FIG. 3f1 in the third temperature section TF2~TH.

In an embodiment where the temperature corresponding to the temperature voltage VTEMP is determined by scanning from the high temperature TH to the low temperature TL, the temperature is determined using the right graph of FIG. 3g1 in the second and third temperature sections TF1~TF2 and TF2~TH, and the left graph of FIG. 3g1 in the first temperature section TL~TF1.

FIG. 3h1 and FIG. 3i1 illustrate temperature voltages VTEMP output from a temperature voltage generator in accordance with embodiments that divide a temperature range TL~TH into four temperature sections TL~TF1, TF1~TF2, TF2~TF3, and TF3~TH.

The temperature voltage VTEMP in FIG. 3h1 may be considered as a combination of four temperature voltages VTEMP1, VTEMP2, VTEMP3 and VTEMP4, shown in FIGS. 3h2, 3h3, 3h4, and 3h5, respectively. Each of the temperature voltages VTEMP1, VTEMP2, VTEMP3 and VTEMP4 may be generated in sequence by a temperature voltage generator shown in FIG. 5.

Figure 5:
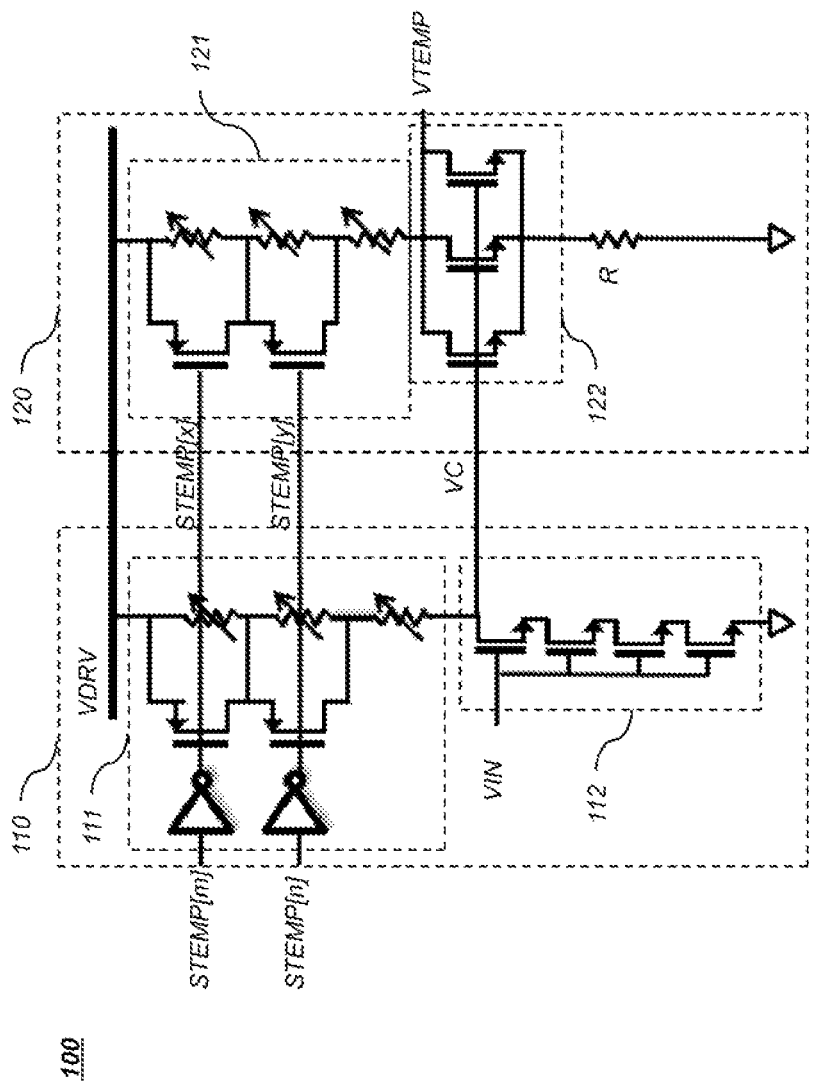

In an embodiment, a reference voltage whose value remains substantially the same in a corresponding temperature section is compared with a temperature voltage in the corresponding temperature section. As illustrated in FIGS. 3h2 to 3h5, the first reference voltage VREF1, the second reference voltage VREF2, the third reference voltage VREF3, and the fourth reference voltage VREF4 are compared with the first temperature voltage VTEMP1, the second temperature voltage VTEMP2, the third temperature voltage VTEMP3, and the fourth temperature voltage VTEMP4, respectively.

Referring to FIGS. 3i2 to 3i5, two reference voltages in each temperature section are compared with a temperature voltage VTEMP in the corresponding temperature section. As shown in FIGS. 3i2 to 3i5, reference voltages VREF11 and VREF12 are compared with the first temperature voltage VTEMP1, reference voltages VREF21 and VREF22 are compared with the second temperature voltage VTEMP2, reference voltages VREF31 and VREF32 are compared with the third temperature voltage VTEMP3. and reference voltages VREF41 and VREF42 are compared with the fourth temperature voltage VTEMP4.

More reference voltages may be used in each temperature section to further increase a resolution of temperature measurement, as will be described in detail with reference to FIGS. 14 and 15a to 15e.

FIG. 4 is a block diagram illustrating a semiconductor device in accordance with an embodiment.

In an embodiment, the semiconductor device includes a temperature voltage generator 100 configured to generate a temperature voltage VTEMP that varies with a temperature in a temperature section according to temperature section signal STEMP. The semiconductor device also includes a reference voltage generator 200 configured to generate a substantially constant first reference voltage VREF in the temperature section, a controller 300 configured to generate the temperature section signal STEMP, and a comparator 400 configured to compare the first reference voltage VREF with the temperature voltage VTEMP.

In an embodiment, the controller 300 generates and outputs a plurality of temperature section signals STEMP sequentially according to temperature sections. In this embodiment, when a section signal STEMP has a predetermined value corresponding to a temperature section at a particular time, the temperature voltage generator 100 outputs a temperature voltage VTEMP whose level and slope vary in the temperature section according to the section signal STEMP. The reference voltage generator 200 outputs a first reference voltage VREF corresponding to the temperature section and the comparator 400 outputs a result of comparison between the two voltages VTEMP and VREF.

FIG. 5 is a block diagram illustrating a temperature voltage generator 100 in accordance with an embodiment In an embodiment shown in FIG. 5, the temperature voltage generator 100 includes a control voltage generator 110 and a temperature voltage output block 120.

The control voltage generator 110 includes a first resistor block 111 whose resistance value is controlled by a temperature section signal STEMP, and a second resistor block 112 whose resistance value is controlled by an input voltage VIN which may be a second reference voltage VIN. The first and second resistor blocks 111 and 112 are coupled to each other in series.

The first resistor block 111 includes one or more transistors and resistors, each of the resistors is coupled in parallel to a corresponding transistor. The second resistor block 112 includes one or more transistors coupled to each other in series. In an embodiment, the transistors included in the first and second resistor blocks 111 and 112 are PMOS and NMOS transistors respectively. In this embodiment, an inverted signal STEMP[x] and [y] of the temperature section signal STEMP[m] and [n] is applied to gates to the PMOS transistors in the first block 111.

The second reference voltage VIN may be controlled by the temperature section signal STEMP and may have different values according to temperature sections. An embodiment of an input voltage generator 130 to generate a VIN comprising a second reference voltage VIN, is illustrated in FIG. 6.

Figure 6:
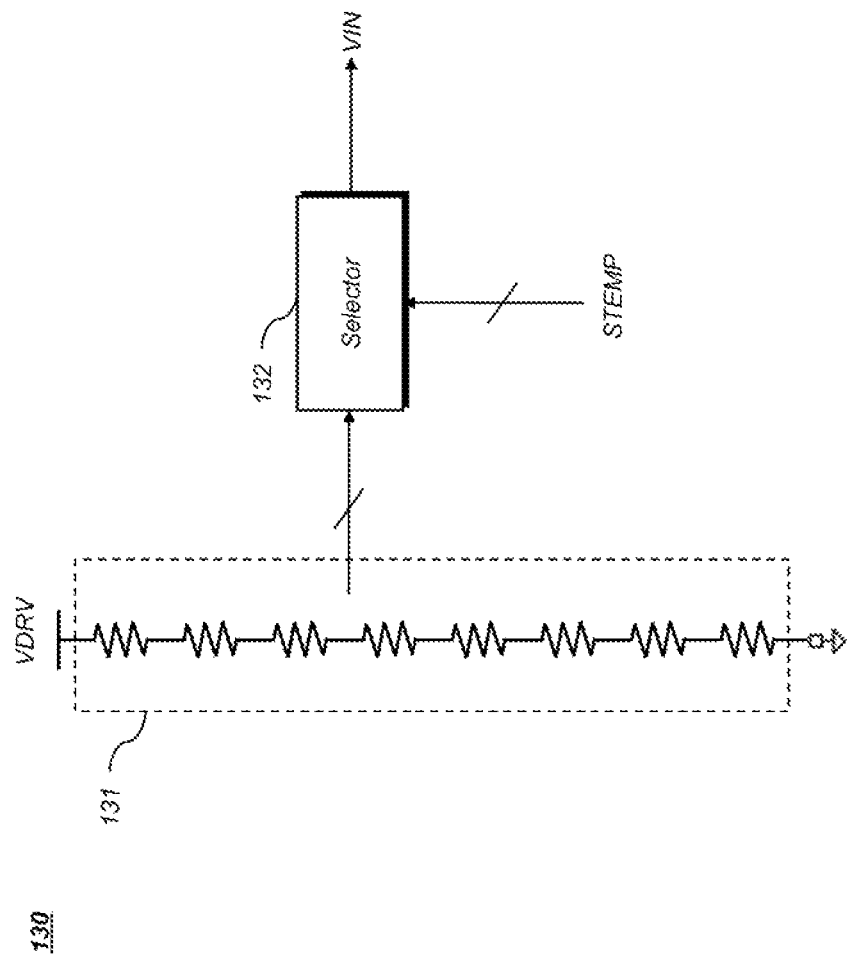
FIG. 6 is a block diagram illustrating an input voltage generator in accordance with an embodiment.

Referring to FIG. 6, the input voltage generator 130 includes a voltage divider 131 to divide a driving voltage VDRV into a plurality of divided voltages. The input voltage generator 130 also includes a selector 132 to select one of the plurality of divided voltages according to a temperature section signal STEMP and output the selected divided voltage as a second reference voltage VIN.

The input voltage generator 130 may be separately comprised in a semiconductor device in an embodiment. In another embodiment, the input voltage generator 130 is comprised in the reference voltage generator 200, as will be described below with reference to FIG. 8.

Referring back to FIG. 5, a temperature voltage output block 120 includes a third resistor block 121 whose resistance value is controlled by the temperature section signal STEMP and a fourth resistor block 122 whose resistance value is controlled by a control voltage VC. The fourth resistor block 122 is coupled to the third resistor block 121 in series. In other embodiments, the resistance value of the third resistor block 121 remains substantially constant while the resistance value of the first resistor block 111 varies according to the temperature section signal STEMP.

The third resistor block 121 includes one or more transistors and resistors, each of the resistors is coupled to a corresponding transistor in parallel. The fourth resistor block 122 includes one or more transistors coupled to each other in parallel. In an embodiment, the transistors included in the third and fourth resistor blocks 121 and 122 are PMOS and NMOS transistors. In this embodiment, an inverted signal STEMP[x] and [y] of the temperature section signal STEMP[m] and [n] is applied to gates of the PMOS transistors in the third resistor block 121.

In an embodiment, the temperature voltage output block 120 further includes a resistor R which is coupled to the fourth resistor block 122.

A temperature voltage VTEMP output from the temperature voltage output block 120 may vary with temperature in a temperature section according to a temperature section signal STEMP and a control voltage VC.

For example, in FIG. 5, the second reference voltage VIN and resistance values of the first resistor block 111 and the third resistor block 121 may be adjusted to control a slope and a level of the temperature voltage VTEMP, as will be discussed below.

The resistance value of the first resistor block 111 may be adjusted according to a value of the temperature section signal STEMP, which varies in different temperature sections. For example, if the resistance value of the first resistor block 111 is decreased while the second reference voltage VIN and the resistance of the third resistor block 121 remain substantially constant, a voltage drop across the first resistor block 111 decreases and the control voltage VC increases. Since a gate-source voltage applied to the transistors of the fourth resistor block 122 is increased, a voltage drop across the third resistor block 121 increases, thereby decreasing a level of the temperature voltage VTEMP. Therefore, by adjusting the value of the temperature section signal STEMP for the first resistor block 111, the level of the temperature voltage VTEMP may be shifted up or down.

The resistance value of the third resistor block 121 may be adjusted according to the value of the temperature section signal STEMP. For example, if the resistance value of the third resistor block 121 changes while the second reference voltage VIN and the resistance of the first resistor block 111 remain substantially constant, an output resistance value seen by the temperature voltage VTEMP is changed. Since a gain of the temperature voltage output block 120 is proportional to the output resistance value, the slope of the temperature voltage VTEMP is changed.

In addition, the second reference voltage VIN may be adjusted according to the value of the temperature section signal STEMP. For example, the second reference voltage VIN is increased while the resistance values of the first resistor block 111 and the third resistor block 121 remain substantially constant. Specifically, if the second reference voltage VIN is high such that a gate-source voltage of the transistors of the second resistor block 112 is greater than a zero-temperature-coefficient (ZTC) of the transistors of the second resistor block 112, as a temperature decreases, a drain-source current Ids through the transistors becomes higher and the control voltage VC is decreased. Since a gate-source voltage of the transistors of the fourth resistor block 122 is decreased, currents through these transistors of the fourth resistor block 122 are also decreased. As a result, a voltage drop across the third resistor block 121 is decreased and the temperature voltage VTEMP is increased. Thus, the temperature voltage VTEMP has a complementary to absolute temperature (CTAT) characteristic, which results in a negative slope of the temperature voltage VTEMP as a function of temperatures. On the other hand, when the second reference voltage is low such that the gate-source voltage of the transistors of the second resistor block 112 is lower than the ZTC of the transistors, the temperature voltage VTEMP has a proportional to absolute temperature (PTAT) characteristic, which results in a positive slope of the temperature voltage VTEMP as shown in the second temperature section TF~TH of FIG. 3c3.

Therefore, by adjusting resistance values of the first resistor block 111 and/or the third resistor block 121, and/or the second reference voltage VIN, the slope and the level of the temperature voltage VTEMP may be controlled as desired.

By controlling the slope and the level of a temperature voltage VTEMP, the temperature voltage VTEMP output from the temperature voltage output block 120 may have various characteristics as illustrated in FIGS. 3a1 to 3i5. In an embodiment, each of the resistance values of the first resistor block 111, the third resistor block 121, the second reference voltage VIN may be adjusted independently by a temperature section signal STEMP.

The temperature section signal STEMP may be used to generate a temperature voltage VTEMP having desired characteristics in each temperature section. In an embodiment, a controller 300 (see FIG. 4) generates a temperature section signal STEMP corresponding to a temperature section for a predetermined period and provide the generated temperature section signal STEMP to the temperature voltage generator 100 and to the first reference voltage generator 200 for the predetermined period. For example, in FIG. 5, the temperature section signal STEMP has a different value STEMP[m]/STEMP [n] (e.g., 0/0, 0/1, 1/0, and 1/1) according to the corresponding temperature section.

Figure 7:
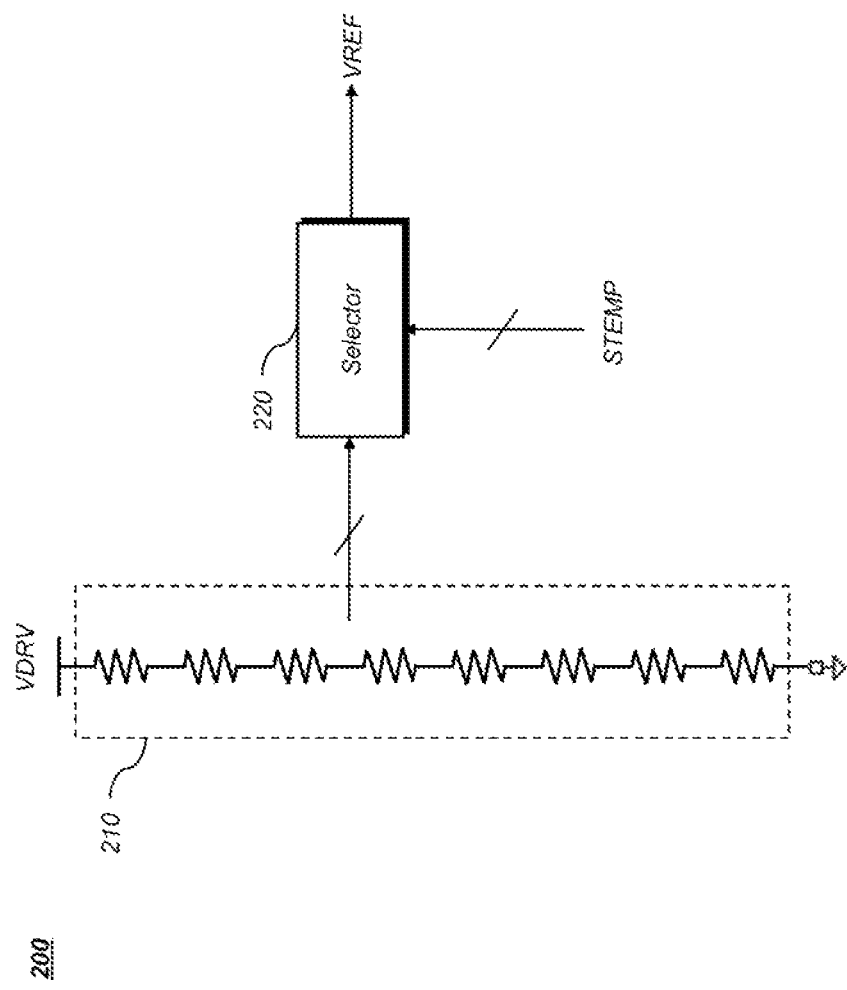
FIG. 7 is a block diagram illustrating a reference voltage generator in accordance with an embodiment.

FIG. 7 is a block diagram illustrating a reference voltage generator in accordance with an embodiment.

Referring to FIG. 7, the reference voltage generator 200 includes a voltage divider 210 to divide a driving voltage VDRV into a plurality of divided voltages. The reference voltage generator 200 also includes a selector 220 to select one of the plurality of divided voltages according to a temperature section signal STEMP and output the selected divided voltage as a first reference voltage VREF.

For example, the divider 210 includes a plurality of resistors connected in series to each other.

In an embodiment, a first reference voltage VREF has substantially constant values in a plurality of temperature sections, and these values may be different from one temperature section to another temperature section.

Figure 8:
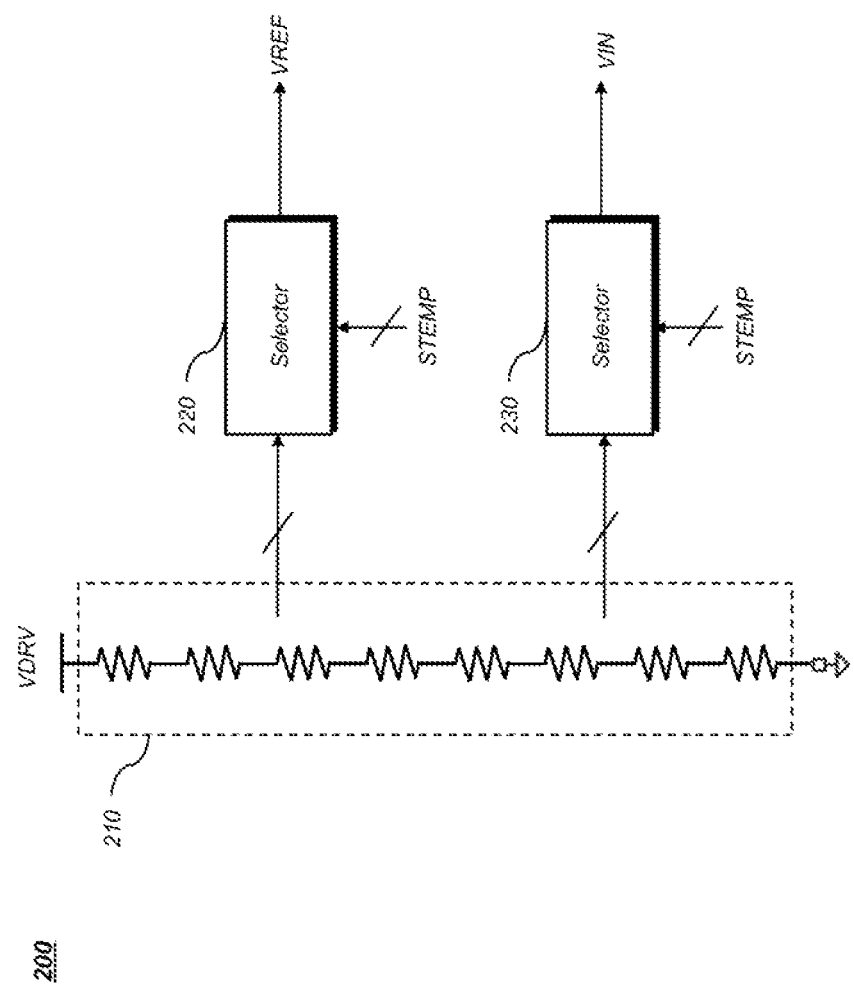
FIG. 8 is a block diagram illustrating a reference voltage generator in accordance with an embodiment.

FIG. 8 is a block diagram illustrating a reference voltage generator in accordance with an embodiment.

In this embodiment, the reference voltage generator 200 further includes a selector 230 to output a second reference voltage VIN to a temperature voltage generator. The selector 230 and the voltage divider 210 function as an input voltage generator 130 shown in FIG. 6. In this embodiment, since the input voltage generator 130 shown in FIG. 6 is included in the reference voltage generator 200, the input voltage generator 130 as illustrated in FIG. 6 is not included in the temperature voltage generator 100 (see FIG. 4).

Figure 9:
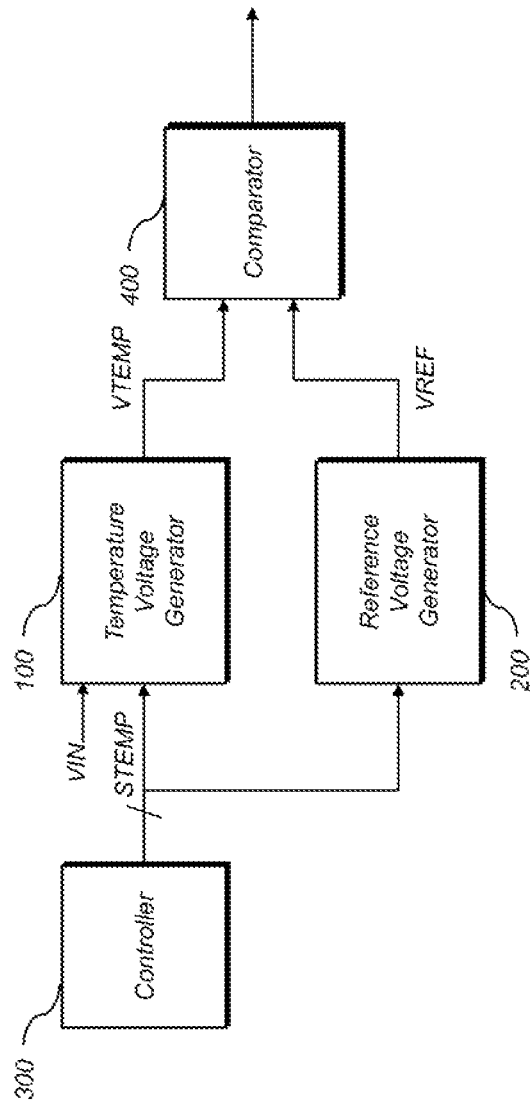
FIG. 9 is a block diagram illustrating a semiconductor device in accordance with an embodiment.

FIG. 9 is a block diagram illustrating a semiconductor device in accordance with another embodiment.

In the embodiment shown in FIG. 9, a second reference voltage VIN is provided from an external node outside the temperature voltage generator 100. In another embodiment, the second reference voltage VIN is generated in the reference voltage generator 200 as illustrated in FIG. 8.

Figure 10:
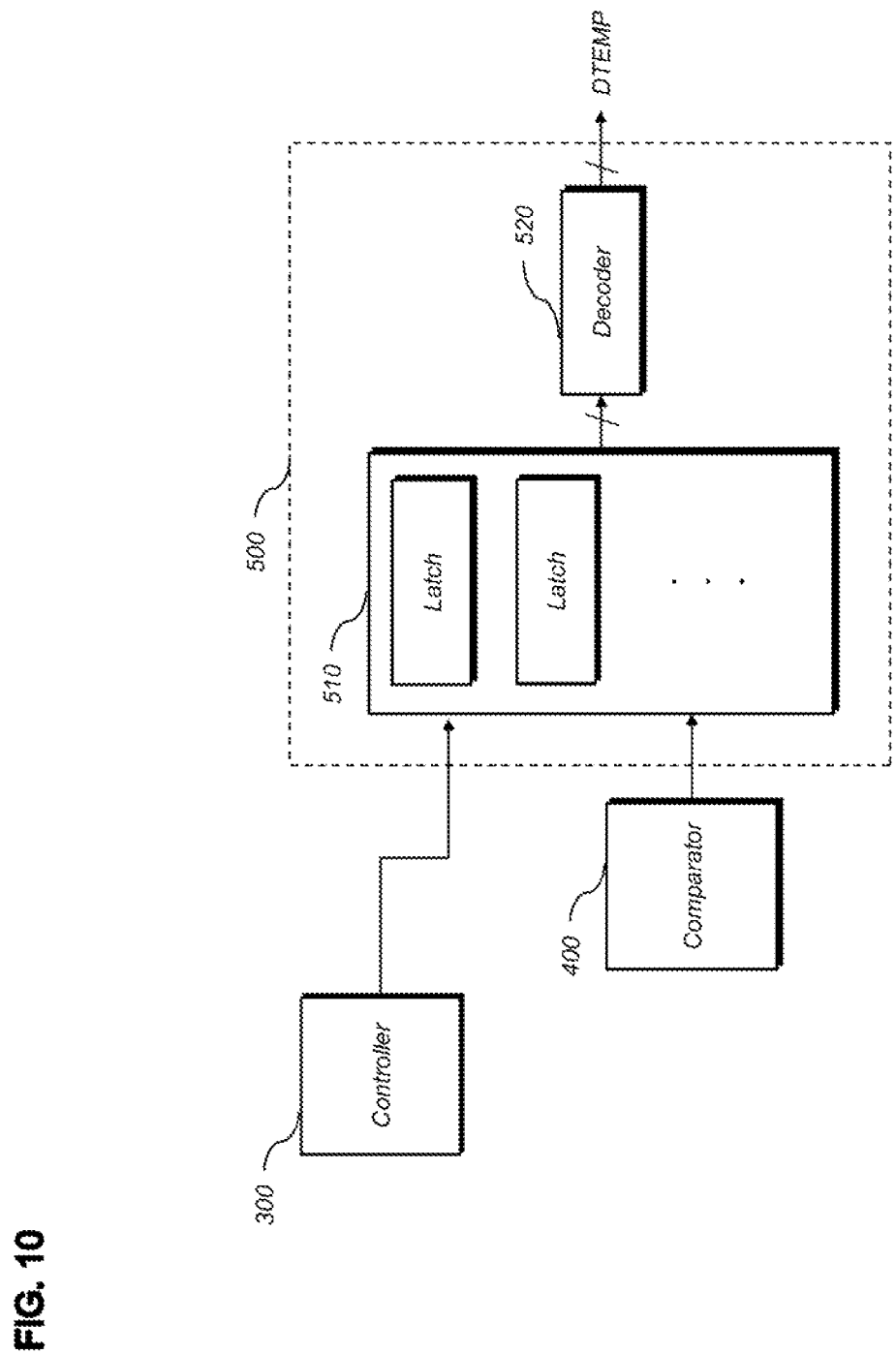
FIG. 10 is a block diagram illustrating a temperature code generator in accordance with an embodiment.

FIG. 10 is a block diagram illustrating a temperature code generator in accordance with an embodiment.

The temperature code generator 500 is included in a semiconductor device in accordance with this embodiment.

The temperature code generator 500 includes a storage block 510 having a plurality of latches and a decoder 520 for generating a temperature code DTEMP from values stored in the storage block 510.

As mentioned above, as shown in FIG. 4, a comparator 400 outputs a result of comparison between a temperature voltage VTEMP and a first reference voltage VREF in each temperature section. The storage block 510 stores each comparison result in a latch corresponding to the temperature section.

A decoder 520 may generate the temperature code DTEMP using the stored values in the plurality of latches of the storage block 510. The coding method to generate the temperature code DTEMP may vary according to embodiments.

Figure 11:
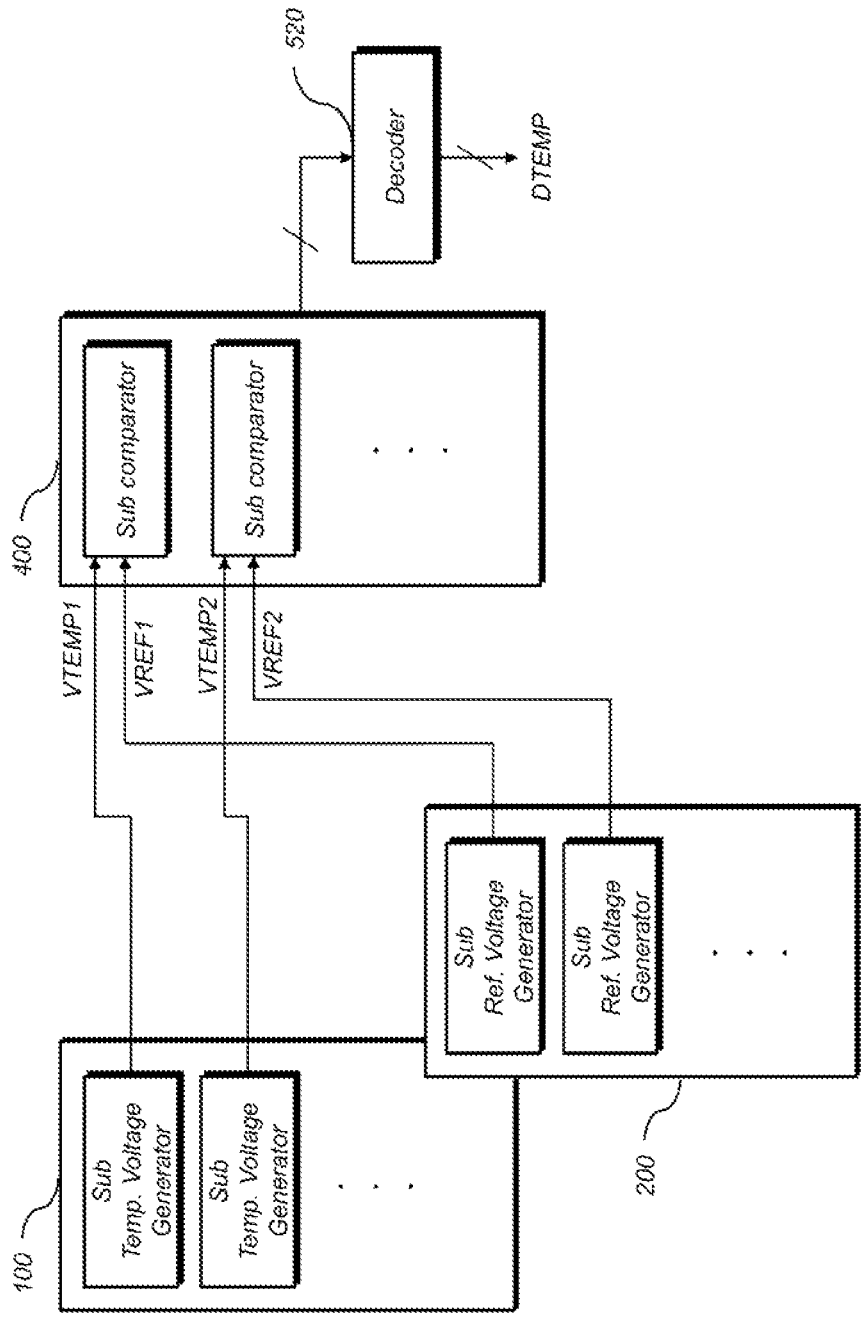
FIG. 11 is a block diagram illustrating a semiconductor device in accordance with an embodiment

FIG. 11 is a block diagram illustrating a semiconductor device in accordance with another embodiment.

In this embodiment, a comparator 400 performs comparing operations on the temperature sections in parallel. On the other hand, the comparator 400 of embodiments shown in FIG. 10 performs each of comparing operations on a corresponding temperature section in sequence.

In this embodiment shown in FIG. 11, a temperature voltage generator 100 includes a plurality of sub temperature voltage generators and a reference voltage generator 200 may include a plurality of sub reference voltage generators. A sub temperature voltage generator generates a temperature voltage (e.g., VTEMP1, VTEMP2, etc.) corresponding to a temperature section and a sub reference voltage generator generates a reference voltage (e.g., VREF1, VREF2, etc.) corresponding to the temperature section.

In an embodiment, each of the sub temperature voltage generators 100 corresponds to the temperature voltage generator 100 as illustrated in FIG. 5, and each of the sub reference voltage generators 200 corresponds to the reference voltage generator 200 as illustrated in FIG. 7.

A temperature section signal STEMP corresponding to a temperature section may be provided to each sub temperature voltage generator and each sub reference voltage generator, so that the sub temperature voltage generator and the reference voltage generator generate a temperature voltage and a reference voltage corresponding to the temperature section. In this embodiment, the comparator 400 includes a plurality of sub comparators that compare the temperature voltage with the sub reference voltage corresponding to the temperature section.

In this embodiment, a decoder 520 generates a temperature code DCODE from a plurality of comparison results from the comparator 400. Since these comparison results are provided from the sub comparators in the comparator 400 at a time to the decoder 520, the latches in the comparator 510 shown in FIG. 10 may be omitted in this embodiment.

In addition, since a plurality of temperature section signals are provided to sub temperature voltage generators and to sub reference voltage generators at a time, a controller 300 (see FIG. 10) configured to provide the plurality of temperature section signals in sequence may be omitted in this embodiment illustrated in FIG. 11.

This embodiment illustrated in FIG. 11 may perform a temperature sensing operation at a faster speed than that illustrated in FIG. 10. In an embodiment, two embodiments shown in FIGS. 10 and 11 may be combined to perform the temperature sensing operation. For example, in some temperature sections an embodiment in FIG. 10 may be used and in the other temperature sections an embodiment in FIG. 11 may be used for performing the temperature sensing operation.

Figure 12:
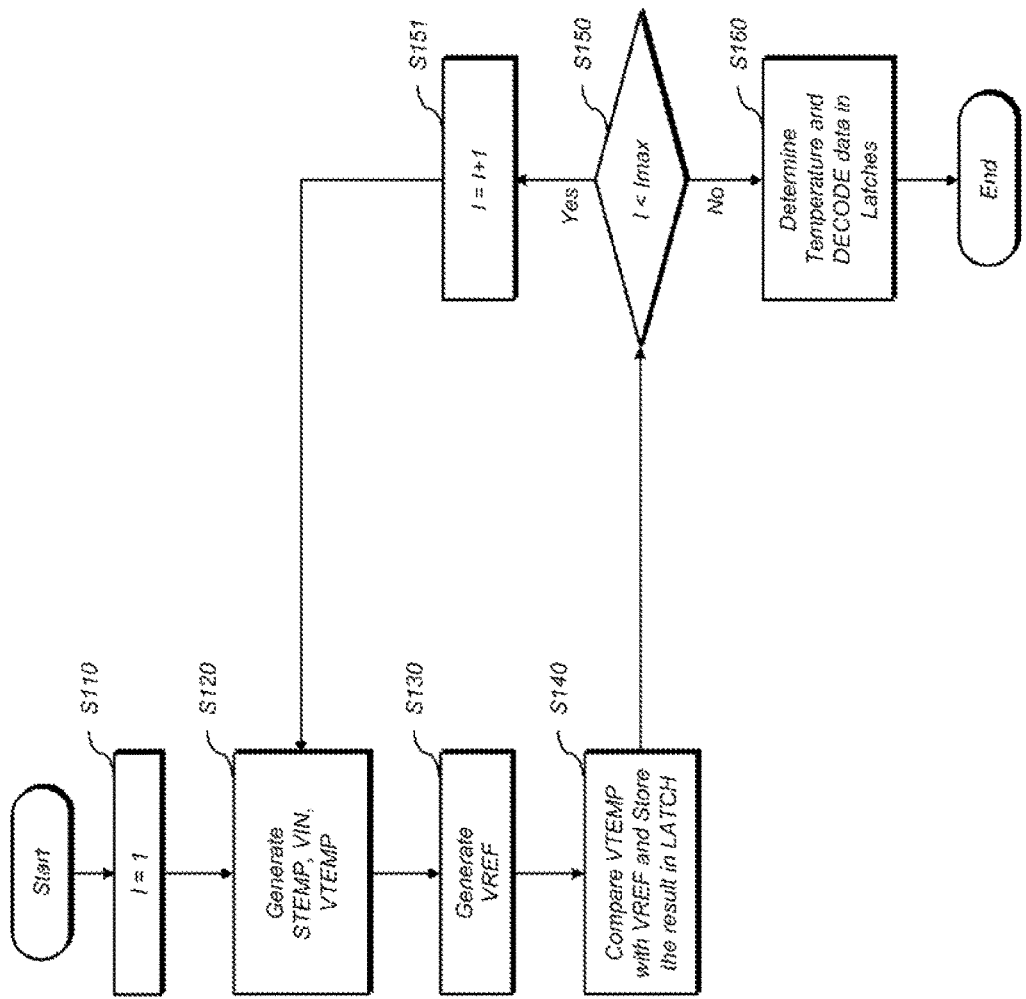
FIG. 12 is a flow chart illustrating an operation of a semiconductor device in accordance with an embodiment.

FIG. 12 is a flow chart illustrating an operation of a semiconductor device in accordance with an embodiment.

At S110, a temperature section variable I corresponding to the first temperature section is initialized as 1.

At S120, a temperature section signal STEMP, a second reference voltage VIN, and a temperature voltage VTEMP corresponding to the Ith temperature section are generated.

At S130, a first reference voltage VREF corresponding to the Ith temperature section is generated.

At S140, the temperature voltage VTEMP and the first reference voltage VREF are compared and a comparison result is stored in a latch corresponding to the temperature section.

At S150, it is determined whether the current temperature section is the last temperature section whose variable I corresponds to Imax. If the current temperature section is not the last temperature section, the current temperature section is changed to the next temperature section at S151 by increasing the temperature section variable from I to I+1 and the process proceeds to the S120.

If the current temperature section is the last temperature section, the stored data in the latches at S140 are decoded at step S160 to determine a temperature.

FIGS. 13*a* to 13*e* illustrate graphs of temperature voltages of the semiconductor device operating in accordance with the flow chart in FIG. 12.

Referring to FIGS. 13*a* to 13*e*, a temperature to be measured is denoted by TC. In FIGS. 13*b* to 13*e*, a reference voltage corresponding to each temperature section is denoted by VREF1~VREF4 and a temperature voltage corresponding to the temperature TC in each temperature section is denoted by VTC1~VTC4.

LATCH(x), where x is one of 1, 2, 3 and 4, denotes a comparison result between the reference voltage VREFx and temperature voltage VTCx in each temperature section. For example, LATCH(X) is set as 1 when VREFx is larger than VTCx, while LATCH(x) is set as 0 when VREFx is equal to or less than VTCx. In this case, the data stored in the latches may be represented as "1100".

The temperature TC may be determined according to the latch data. In an embodiment, by checking a transition point of the latch data, the temperature TC is determined. For the example shown in FIGS. 13*b* to 13*e*, since the transition of the latch data occurs between the second latch and the third latch, the temperature voltage VTEMP corresponding to the temperature TC is between the reference voltage VREF2 and VREF3. When the temperature T2 corresponding to the temperature voltage VREF2 in the second temperature section TF1~TF2 and the temperature T3 corresponding to the temperature voltage VREF3 in the third temperature section TF2~TF3 are determined, the temperature TC is between T2 and T3.

The temperature code DTEMP representing the temperature TC may be coded using various methods from the latch data, as required by other internal or external circuit elements.

In this embodiment shown in FIGS. 12-13*e*, the temperature resolution depends on the number and widths of temperature sections. The temperature resolution may be further increased by using two or more reference voltages in each temperature section, as will be described with reference to FIGS. 14-15*e*.

Figure 14:
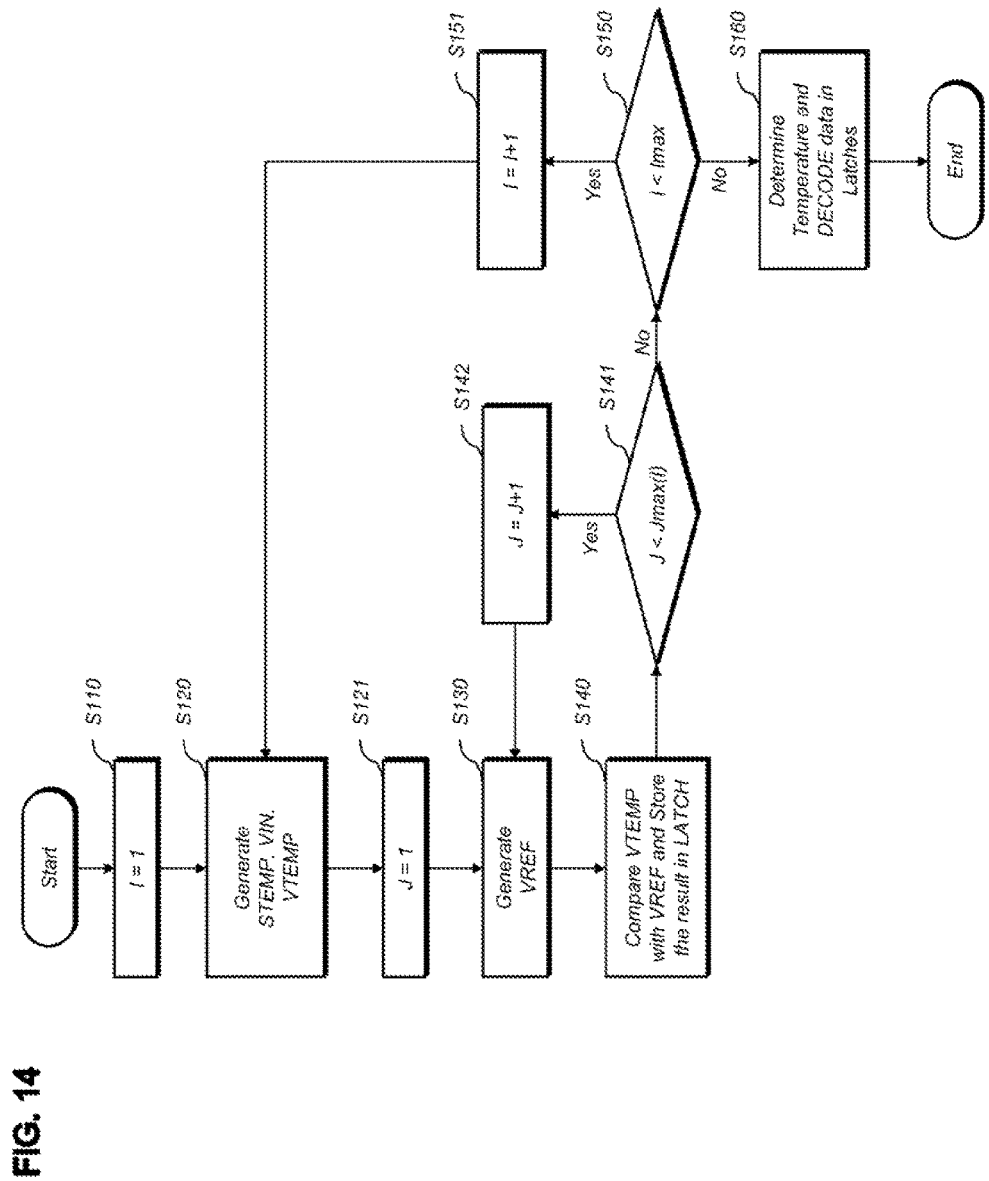
FIG. 14 is a flow chart illustrating an operation of a semiconductor device in accordance with an embodiment.

FIG. 14 is a flow chart illustrating an operation of a semiconductor device in accordance with an embodiment.

At S110, the temperature section variable I corresponding to the first temperature section is initialized as 1.

At S120, a temperature section signal STEMP, a second reference voltage VIN, and a temperature voltage VTEMP corresponding to the Ith temperature section are generated.

At S121, a reference voltage variable J corresponding to the Ith temperature section is initialized as 1.

At S130, a Jth reference voltage VREF corresponding to the Ith temperature section is generated.

At S140, the temperature voltage VTEMP and the Jth reference voltage VREF are compared and a comparison result is stored in a latch corresponding to the temperature section.

At S141, it is determined whether the current reference voltage VREF is the last reference voltage whose variable corresponds to Jmax in the current temperature section. If the current reference voltage is not the last reference voltage, the current reference voltage is changed to the next reference voltage at S142 by increasing the reference voltage variable from J to J+1 and the process proceeds to the S130.

If the current reference voltage is the last reference voltage, the process proceeds to the S150.

At S150, it is determined whether the current temperature section is the last temperature section whose variable I corresponds to Imax. If the current temperature section is not the last temperature section, the current temperature section is changed to the next temperature section at S151 by increasing the temperature section variable from I to I+1 and the process proceeds to the S120.

If the current temperature section is the last temperature section, the stored data in the latches are decoded at S160 to determine a temperature.

FIGS. 15*a* to 15*e* illustrate temperature voltages of a semiconductor device operating in accordance with the flow chart of FIG. 14.

Referring to FIGS. 15*a* to 15*e*, a temperature to be measured is denoted by TC. In FIGS. 15*a* to 15*e*, a Jth reference voltage in an Ith temperature section is denoted by VREFIJ, where I is one of 1, 2, 3 and 4 and J is one of 1 and 2, and a temperature voltage corresponding to the temperature TC in the Ith temperature section is denoted by VTCI. LATCH (I, J) denotes a comparison result between the reference voltage VREFIJ and the temperature voltage VTCI in the Ith temperature section. For example, LATCH (I, J) is set as 1 when VREFIJ is larger than VTCI and LATCH (I, J) is set as 0 when VREFIJ is equal to or less than VTCI. In this case, the data stored in the latches may be represented as "11 10 00 00" as shown in FIGS. 15*a* to 15*e*.

The temperature TC may be determined according to the latch data. In an embodiment, by checking a transition point of the latch data, the temperature TC may be determined. For the example shown in FIGS. 15*a* to 15*e*, since the transition occurs in the second latch, the temperature voltage VTEMP corresponding to the temperature TC is between the reference voltage VREF21 and VREF22. When the temperature T21 corresponding to the temperature voltage VREF21 in the second temperature section TF1~TF2 and the temperature T22 corresponding to the temperature voltage VREF22 in the second temperature section TF1~TF2 are determined, the temperature TC is between T21 and T22. Since the interval between T21 and T22 is shorter than that between T2 and T3 in FIGS. 13a to 13e, this embodiment shown in FIGS. 15a to 15e has a better resolution than that in FIGS. 13a to 13e.

Although various embodiments have been described for illustrative purposes, it will be apparent to those skilled in the art that various changes and modifications may be made without departing from the spirit and scope of the disclosure as defined in the following claims.

What is claimed is:

1. A semiconductor device comprising:
   a first signal generator configured to generate a plurality of first signals, each of the plurality of first signals varying with a temperature in a corresponding one of a plurality of temperature sections; and
   a second signal generator configured to generate a plurality of second signals, each of the plurality of second signals being substantially constant in a corresponding one of the plurality of temperature sections,
   wherein each of the plurality of temperature sections corresponds to a divided portion of a temperature measurement range by a given number, the plurality of temperature sections including a first temperature section corresponding to a first divided portion of the temperature measurement range and a second temperature section corresponding to a second divided portion of the temperature measurement range, and
   wherein the plurality of first signals includes a third signal and a fourth signal, the third signal varying in the first temperature section, the fourth signal varying in the second temperature section.

2. The semiconductor device of claim 1 further comprising:
   a controller configured to generate a plurality of temperature section signals, each of the plurality of temperature section signals corresponding to one of the plurality of temperature sections.

3. The semiconductor device of claim 2 further comprising:
   a comparator configured to compare one of the plurality of first signals with a corresponding second signal in a corresponding temperature section.

4. The semiconductor device of claim 3 further comprising:
   a plurality of latches, each of the plurality of latches storing a result from the comparator in the corresponding temperature section; and
   a decoder configured to generate a temperature code using a plurality of results stored in the plurality of latches.

5. The semiconductor device of claim 1, wherein the first signal generator includes a plurality of sub first signal generators, each of the sub first signal generators generating a corresponding first signal varying in a corresponding temperature section.

6. The semiconductor device of claim 5, wherein the second signal generator includes a plurality of sub second signal generators, each of the sub second signal generators generating a corresponding reference voltage that is substantially constant in the corresponding temperature section.

7. The semiconductor device of claim 6 further comprising a plurality of comparators, each of the comparators comparing the corresponding first signal with the corresponding reference voltage.

8. The semiconductor device of claim 7 further comprising a decoder configured to generate a temperature code according to a plurality of outputs from the plurality of comparators.

9. The semiconductor device of claim 1, wherein a the third signal of the plurality of first signals is represented by a first equation that is different from a second equation representing the fourth signal of the plurality of first signals.

10. The semiconductor device of claim 1, wherein each of the plurality of first signals varies with the temperature only in the corresponding one of the plurality of temperature sections.

11. The semiconductor device of claim 1, wherein the third signal of the plurality of first signals has a first slope in the first temperature section and is substantially constant in the second temperature section, and
   wherein the fourth signal of the plurality of first signals is substantially constant in the first temperature section and has a second slope in the second temperature section.

* * * * *